US012732247B2

(12) United States Patent
Medra et al.

(10) Patent No.: US 12,732,247 B2
(45) Date of Patent: Sep. 8, 2026

(54) METHOD AND APPARATUS FOR SIGNALING FOR BEAM MANAGEMENT USING CHIRP BEAMS

(71) Applicant: Huawei Technologies Co., Ltd., Shenzhen (CN)

(72) Inventors: Mostafa Medra, Kanata (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 18/671,104

(22) Filed: May 22, 2024

(65) Prior Publication Data

US 2024/0313836 A1 Sep. 19, 2024

Related U.S. Application Data

(63) Continuation of application No. PCT/CN2021/133177, filed on Nov. 25, 2021.

(51) Int. Cl.

*H04B 7/06* (2006.01)
*H04L 5/00* (2006.01)
*H04W 8/22* (2009.01)

(52) U.S. Cl.

CPC ......... *H04B 7/0617* (2013.01); *H04L 5/0051* (2013.01); *H04W 8/22* (2013.01)

(58) Field of Classification Search

CPC ....... H04B 7/0617; H04L 5/0051; H04W 8/22
See application file for complete search history.

(56) References Cited

U.S. PATENT DOCUMENTS

2009/0093222 A1* 4/2009 Sarkar .................. H04B 7/0617 455/127.2
2010/0255790 A1* 10/2010 Farajidana ........... H04B 7/0695 455/69
2016/0150418 A1 5/2016 Kang et al.
2017/0231021 A1 8/2017 Tavildar
2017/0332249 A1 11/2017 Guey
2019/0033453 A1 1/2019 Crouch
2021/0041522 A1* 2/2021 Manolakos ........... G01S 1/0428
2024/0219510 A1* 7/2024 Bayesteh ............ G01S 5/02529
2024/0348314 A1* 10/2024 Medra .................. H04B 7/0617

FOREIGN PATENT DOCUMENTS

CA 3232052 A1 * 3/2023 ........... G01S 5/0273
CN 110535518 A 12/2019
CN 107493125 B 8/2020
JP 2020522945 A 7/2020
WO WO-2023092396 A1 * 6/2023 .............. H04W 8/22

OTHER PUBLICATIONS

Rui Peng, et al, Robust Wide-Beam Analog Beamforming With Inaccurate Channel Angular Information, IEEE Communications Letters, vol. 22, Issue: 3, Dec. 11, 2017, total 4 pages.

* cited by examiner

*Primary Examiner* — Melvin C Marcelo
(74) *Attorney, Agent, or Firm* — Slater Matsil, LLP

(57) ABSTRACT

According to some embodiments, a user equipment (UE) transmits UE parameter information for generating chirp beams used by a base station to beamform a beam transmitted to the UE. The UE receives a reference signal that is beamformed using a chirp beam that is based at least in part on the UE parameter information. The UE measures the reference signal to generate feedback information. The UE transmits the feedback information to the base station.

30 Claims, 13 Drawing Sheets

METHOD AND APPARATUS FOR SIGNALING FOR BEAM MANAGEMENT USING CHIRP BEAMS

CROSS REFERENCE

This application is a continuation of International Application No. PCT/CN2021/133177, filed on Nov. 25, 2021, the disclosure of which is hereby incorporated by reference in its entirety.

TECHNICAL FIELD

The present disclosure relates generally to wireless communications, and in particular embodiments, to methods and devices for signaling for beam management using chirp beams.

BACKGROUND

In some wireless communication systems, user equipments (UEs) wirelessly communicate with a base station (BS) to send data to the base station and/or receive data from the base station. A wireless communication from a UE to a BS is referred to as an uplink (UL) communication. A wireless communication from a base station to a UE is referred to as a downlink (DL) communication.

Resources are required to perform uplink and downlink communications in such wireless communication systems. For example, a BS may wirelessly transmit data, such as a transport block (TB), using wireless signals and/or physical layer channels, to a UE in a downlink transmission at a particular frequency and over a particular duration of time. The frequency and time duration used are examples of resources.

In some wireless communication systems, beamforming is used in which a communication signal is transmitted in a particular direction instead of being transmitted omni-directionally. High frequency communication is a technology that may improve the performance of future cellular networks due to a large bandwidth for communication. However, the higher the frequency involved the smaller the antenna sizes involved. Therefore, more antennas may be needed in multiple-input multiple-output (MIMO) systems to facilitate the high frequency communication (e.g. by satisfying a certain signal to noise ratio (SNR) threshold at the receiver).

At millimeter wave (mmWave) band and THz band signal attenuation is significant and large beamforming gains are required to overcome the signal attenuation. Large beamforming gains may be achieved through using a large number of antenna elements at the BS and the UE to generate narrow beams. However, the use of narrow beams causes the transmit and receive beam alignment procedure to take longer when using beam sweeping because more beams may be needed over a given range with narrow beams than over the same range with wider beams.

Analog beamforming is useful for providing additional gains that can combat the channel path loss in multi-antenna systems. Analog beamforming may be performed by having a phase shifter attached to each antenna and a number of phase shifters and antennas connected in a single radio frequency (RF) chain. One of the most common analog beamforming methods is using a discrete Fourier transformation (DFT) matrix, where a number of rows of the DFT matrix is the same as a number of antennas. In this case, each column of the DFT matrix is a beamformer that points in a certain direction in space, the direction defined by an angle with respect to a reference point, and may be used to transmit or receive in that direction. In some deployments, an extended DFT matrix may be used. The columns of the extended DFT matrix are expressed as exp $$\left(-\frac{j2\pi\alpha n}{N}\right),$$

$n=0, \ldots, N-1$ where N is a number of rows in the matrix and $\alpha$ is any number and not necessarily an integer as used in a regular DFT matrix. The phase value changes in a linear progression across the antenna elements of the array. The regular or extended DFT matrix can be referred to as a codebook. For dual polarized antenna sets, each polarization may receive its own codebook. Accordingly, each beam has a peak value in a certain direction or angle, and the selection of a certain beam depends on a desired direction or angle. When a beam that is pointing in a direction to serve a UE, the UE may change its location so that the beam no longer points to the UE. Movement of the UE with respect to the beam may be more pronounced at higher frequencies and when the beams are narrower in order to provide higher gain to combat higher path loss experienced at higher frequency ranges.

In addition to beam angle, there are various other analog beamforming parameters that may be used in defining an analog beamformed beam. Beam width defines how wide a beam is while still providing a particular beamforming gain. The beam width may determine how much of the area around the UE will still have beamforming gain when this UE is moving. For example, the wider the beam width, the larger the area around the UE is covered by the beam and therefore the more the UE can move and still maintain some amount of beamforming gain.

Some systems may use chirp beams instead of DFT beams as chirp beams have a controllable beam width that can provide gains for a larger areas. Therefore the chirp beams may provide robustness against angular errors as the beam can still serve an area around the UE. However, this use of chirp beams may decrease the peak gain.

When the BS or UE has many antennas, these antennas can be arranged in many forms. One common way is to place them in a 1D linear array with equal spacing. Another common way is to place them in a regular rectangular grid in 2D. For 1D arrays, DFT or chirp beams may be used for beamforming. When 2D arrays are being used, conventional methods typically use two 1D beams on each direction or axis of the rectangular grid. This arrangement can be represented by the Kronecker product of the two 1D beams to obtain the 2D beam. When the beamforming in 2D is performed in this manner, the robustness of the 2D beam depends on the robustness of the underlying 1D beams. For example, if the 1D beams are horizontal and vertical beams, then the robustness that may be obtained is in a horizontal and/or a vertical direction, and it is not possible to obtain robustness in any other general direction.

Providing robustness for any direction in analog beamforming for a 2D antenna array as compared to only directions of underlying 1D beams would be beneficial for telecommunication systems, in particular those operating at mmWave band and THz band.

SUMMARY

Aspects of the present disclosure provide a method for using 2D chirp beams that are designed for beamforming with a 2D antenna array rather than simply obtaining 2D array beams from a Kronecker product of underlying 1D array beams. The method allows a robustness in any arbitrary direction rather than only the directions of the underlying 1D array beams as occurs when using a Kronecker product of underlying 1D array beams. Aspects of the present disclosure also provide signalling schemes that allow a transmitter and a receiver to utilize the 2D beamforming method and benefit from using beams generated from the 2D beamforming method.

According to an aspect there is provided, a method of analog beamforming a signal involving: beamforming a signal to be transmitted by an array of antennas, where the beamforming involves applying beam coefficients to the array of antennas; wherein the beam coefficients pertain to beam direction and beam robustness; wherein applying the beam coefficients involves adjusting the beam coefficients to obtain robustness in any direction.

According to an aspect there is provided, a method for use in analog beam management involving: transmitting, by a user equipment (UE), UE parameter information for use in generating chirp beams used by a base station to beamform a beam transmitted to the UE; receiving, by the UE, a reference signal from the base station that is beamformed using a chirp beam that is based at least in part on the UE parameter information; measuring, by the UE, the received reference signal to generate feedback information; and transmitting, by the UE, the feedback information to the base station.

According to an aspect there is provided, a device including a processor and a computer-readable medium. The computer-readable medium has stored thereon, computer executable instructions, that when executed cause the processor to perform a method described above or detailed below.

According to an aspect there is provided, a method for use in beam management involving: receiving, by a base station, UE parameter information for use in generating chirp beams used by the base station to beamform a beam transmitted to the UE; transmitting, by the base station, a reference signal from the base station that is beamformed using a chirp beam based at least in part on UE parameter information; and receiving, by the base station, feedback information from the UE pertaining to the beamformed reference signal received at the UE.

According to an aspect there is provided, a device including a processor and a computer-readable medium. The computer-readable medium has stored thereon, computer executable instructions, that when executed cause the processor to perform a method described above or detailed below.

According to an aspect there is provided, a method for use in beam management involving: receiving, by a user equipment (UE), base station parameter information used for generating chirp beams used by a base station to beamform a beam to the UE; receiving, by the UE, a reference signal from the base station that is beamformed using the generated chirp beams; and measuring, by the UE, the received reference signal to generate feedback information; and transmitting, by the UE, the feedback information to the base station.

In some embodiments, the method further involves: transmitting, by the UE, UE parameter information that will affect chirp beams used by the base station to beamform the at least one of control or data signal to the UE.

In some embodiments, the method further involves: transmitting, by the UE, confirmation or modification information pertaining to the base station capability information and base station parameter information that will affect chirp beams.

In some embodiments, the method further involves: receiving, by the UE, confirmation or modification of the UE parameter information that will affect chirp beams transmitted to the base station by the UE.

In some embodiments, the method further involves: transmitting, by the UE, a request to the base station to update the chirp beam used in beamforming a control or data signal to the UE.

In some embodiments, the UE parameter information that will affect chirp beams includes a recommended beam width to be generated by the chirp beam.

In some embodiments, the UE parameter information chirp beams is based on one or more of: a velocity of the UE; a direction of movement of the UE; a location of the UE; interference measured at the UE; a signal-to-noise ratio calculated at the UE; uncertainty of one or more of the velocity of the UE, the direction of movement of the UE, the location of the UE, interference measured at the UE, or the signal-to-noise ratio calculated at the UE.

In some embodiments, the UE parameter information that will affect chirp beams is an identification of more than one beam.

In some embodiments, the identification of more than one beam includes a first beam for initial access and a second beam for refinement of beam sweeping between the UE and base station.

In some embodiments, the at least one of base station capability information and base station parameter that will affect beams includes: an identification of a beam width; or parameter information that can be used by the UE to allow the UE to determine a beam width.

According to an aspect there is provided, a device including a processor and a computer-readable medium. The computer-readable medium has stored thereon, computer executable instructions, that when executed cause the processor to perform a method described above or detailed below.

According to an aspect there is provided, a method for use in beam management involving: transmitting, by a base station, at least one of base station capability information and base station parameter information pertaining to chirp beams used by the base station to beamform at least one of a control or data signal to a UE; transmitting, by the base station, a reference signal to the UE that is beamformed based at least in part on the at least one of base station capability information and base station parameter information pertaining to chirp beams; and receiving, by the base station, feedback information pertaining to the beamformed control or data signal to the base station.

In some embodiments, the method further involves: receiving, by the base station, UE parameter information that will affect chirp beams used by the base station to beamform the at least one of control or data signal to the UE.

In some embodiments, the method further involves: receiving, by the base station, confirmation or modification information pertaining to the base station capability information and base station parameter information pertaining to chirp beams.

In some embodiments, the method further involves: transmitting, by the base station, confirmation or modification of the UE parameter information that will affect chirp beams transmitted to the base station by the UE.

In some embodiments, the method further involves: receiving, by the base station, a request from the UE to update the chirp beam used in beamforming a control or data signal to the UE.

In some embodiments, the UE parameter information that will affect chirp beams include a recommended beam width to be generated by the chirp beam.

In some embodiments, the UE parameter information that will affect chirp beams is based on one or more of: a velocity of the UE; a direction of movement of the UE; a location of the UE; interference measured at the UE; a signal-to-noise ratio calculated at the UE; uncertainty of one or more of the velocity of the UE, the direction of movement of the UE, the location of the UE, interference measured at the UE, or the signal-to-noise ratio calculated at the UE.

In some embodiments, the UE parameter information that will affect chirp beams is an identification of more than one beam.

In some embodiments, the identification of more than one beam includes a first beam for initial access and a second beam for refinement of beam sweeping between the UE and base station.

In some embodiments, the at least one of base station capability information and base station parameter information pertaining to chirp beams includes: an identification of a beam width; or parameter information that can be used by the UE to allow the UE to determine a beam width.

According to an aspect there is provided, a device including a processor and a computer-readable medium. The computer-readable medium has stored thereon, computer executable instructions, that when executed cause the processor to perform a method described above or detailed below.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

Figure 1A:
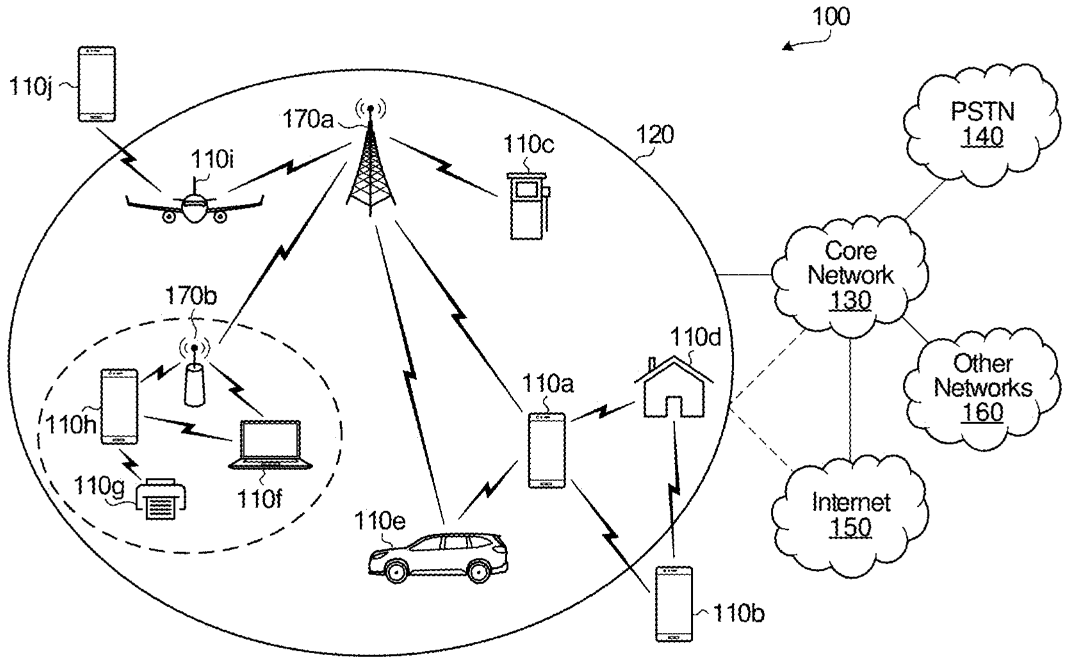
FIG. 1A is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Beam acquisition for massive MIMO systems can be challenging at high frequencies such as millimeter wave (mmWave) and subTHz band (>100 GHz) due to the large overhead of control signaling and processing time needed when performing beam sweeping (due to beam sweeping overhead) via narrow beams. An increase in latency can also be another issue impacting beam acquisition at mmWave and subTHz frequencies.

When performing beam sweeping via narrow beams, the transmitter sends reference signals via the narrow beams in different directions while the receiver searches via narrow beams for reference signals transmitted by the transmitter, also in a number of different directions. Examples of a type of reference signal that may be transmitted by a transmitter, such as a base station, may be a channel state information reference signal (CSI-RS) or a positioning reference signal (PRS). An example of a type of reference signal that may be transmitted by a receiver, such as a user equipment (UE), may be a sounding reference signal (SRS). If only narrow beams are being used, then many beams may be needed, as opposed to when wide beams are used, fewer beams may be needed. Beam sweeping overhead involves a number of beam pairs (a transmitter beam and a receiver beam forming a beam pair) that are searched in order to find one or more beam pairs that have preferred characteristics (e.g., best signal strength) for data communication between the transmitter and receiver. Besides the number of beam pairs, the beam sweeping overhead also depends on a duration to perform the measurement (e.g. measurement of the receive signal strength). The time to perform the measurement may also depend on the sequence length. The variation in sequence length determines quality of the measurement. For example, a longer sequence length results in high quality and shorter length results in lower quality. However, a longer sequence length results in higher overhead. Therefore, there is a tradeoff between measurement quality and the amount of overhead. Note that with fixed duration per measurement of one beam-pair, the beam sweeping overhead is reduced when searching among fewer beam-pairs to find one or more beam pairs that have preferred characteristics (e.g., best signal strength).

Sensing technology may be used to perceive the environment in the area of a transmitter, which enables a transmission channel on at least one beam pair to be determined between the transmitter and receiver. In some implementations, if the propagation environment is known a priori, an mmWave channel can be estimated with higher accuracy and less overhead, especially in massive antenna arrays and for large bandwidth.

As compared to sub-6 GHZ communication systems, the propagation environment for mmWave and sub-THz consists of objects that act as reflectors as opposed to objects that may scatter a communication signal. Therefore, in the propagation environment for mmWave and sub-THz much of the signal energy is restricted to line-of-sight (LOS) paths and reflected paths.

Sensing of the environment may be used to assist beamforming, for example beam acquisition, as well as beam management. Sensing may enable minimizing, and possibly eliminating beam sweeping as part of the beam acquisition process. Sensing may enable minimizing channel state information (CSI) acquisition overhead and minimizing latency in the acquisition process. Sensing may also enable the transmitter, or the network the transmitter communicates with, to follow the receiver using channel predication. For example, in some embodiments, as part of a sensing functionality the transmitter may be able to determine movement (speed and direction) of the receiver and based on such determined movement may be able to predict future movement of the receiver. Based on the determined movement and/or prediction of the movement, the transmitter may be able to estimate the channel for the determined movement and/or the predicted movement. Sensing may also enable proactive beam management. Beam management may involve aligning a transmit (Tx) beam from the transmitter side and a receive (Rx) beam from the receiver side to form a transmit receive beam pair. Beam management may also consist of at least one of beam training and beam tracking.

For a linear 1D array of N antennas that are separated by half the wavelength (denoted by λ) the phase of the phase shifter coupled to an nth antenna (n=0 to N−1) using a beam pointing at angle θ at antenna index n can be written as $e^{-j\pi n \sin\theta}$, a phase term that is linear in n. In order to provide a certain level of robustness, to potentially have better beamforming gain around that angle θ, a chirp beam may be used having a form of $$e^{-j\pi n \sin\theta} e^{-j\pi\frac{un(n-N+1)}{N}},$$

where u is directly related to a desired beam width. The beam resulting from inclusion of the quadratic phase term $$\left(e^{-j\pi\frac{un(n-N+1)}{N}}\right.$$

phase term is quadratic in n) covers beams ranging from approximately $$\sin^{-1}\left(\sin\theta - \frac{u(N-1)}{N}\right) \text{ to } \sin^{-1}\left(\sin\theta + \frac{u(N-1)}{N}\right),$$

but cannot be narrower than a beam presented by the extended DFT precoder $e^{-j\pi n \sin\theta}$.

2D chirp beams pointing at angles $\theta_1$ and $\theta_2$ (which are the beam angles with respect to the axes of the antenna panel) for an $N_1 \times N_2$ antenna array can be expressed at antenna index $n_1$, $n_2$ ($n_1$=0 to $N_1-1$ and $n_2$=0 to $N_2-1$) as:

$$e^{-j\pi n_1 \sin\theta_1} e^{-j\pi\frac{u_1 n_1(n_1-N_1+1)}{N_1}} e^{-j\pi n_2 \sin\theta_2} e^{-j\pi\frac{u_2 n_2(n_2-N_2+1)}{N_2}}.$$

As can be seen, the chirp phase terms for each angle $\theta_1$ and $\theta_2$ are independent. For example, if the antenna array is located in an XY plane in which the antennas of the array lie alongside the X and Y axes, $\theta_1=\sin^{-1}(\sin\theta_s \cos\phi_s)$ and $\theta_2=\sin^{-1}(\sin\theta_s \sin\phi_s)$, where $\theta_s$, $\phi_s$ are polar and azimuthal angles in spherical coordinates, respectively.

Aspects of the present disclosure provide a method for using 2D chirp beams that are designed for beamforming with a 2D antenna array rather than simply obtaining 2D array beams from a Kronecker product of underlying 1D array beams. The method allows a robustness in any arbitrary direction rather than only the directions of the underlying 1D array beams. Aspects of the present disclosure also provide signalling schemes that allow a transmitter and a receiver to utilize the 2D beamforming method and benefit from using beams generated from the 2D beamforming method.

Figure 1B:
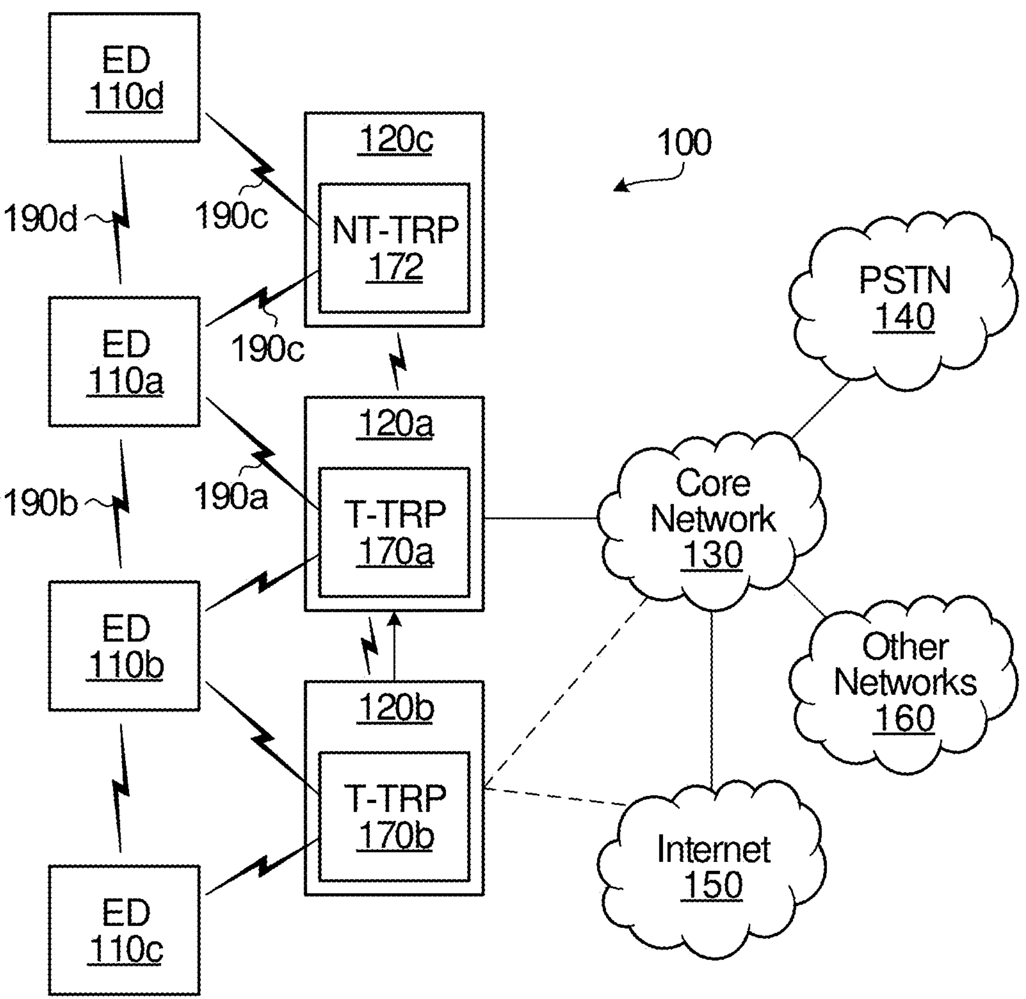
FIG. 1B is another schematic diagram of a communication system in which embodiments of the disclosure may occur.
Figure 2:
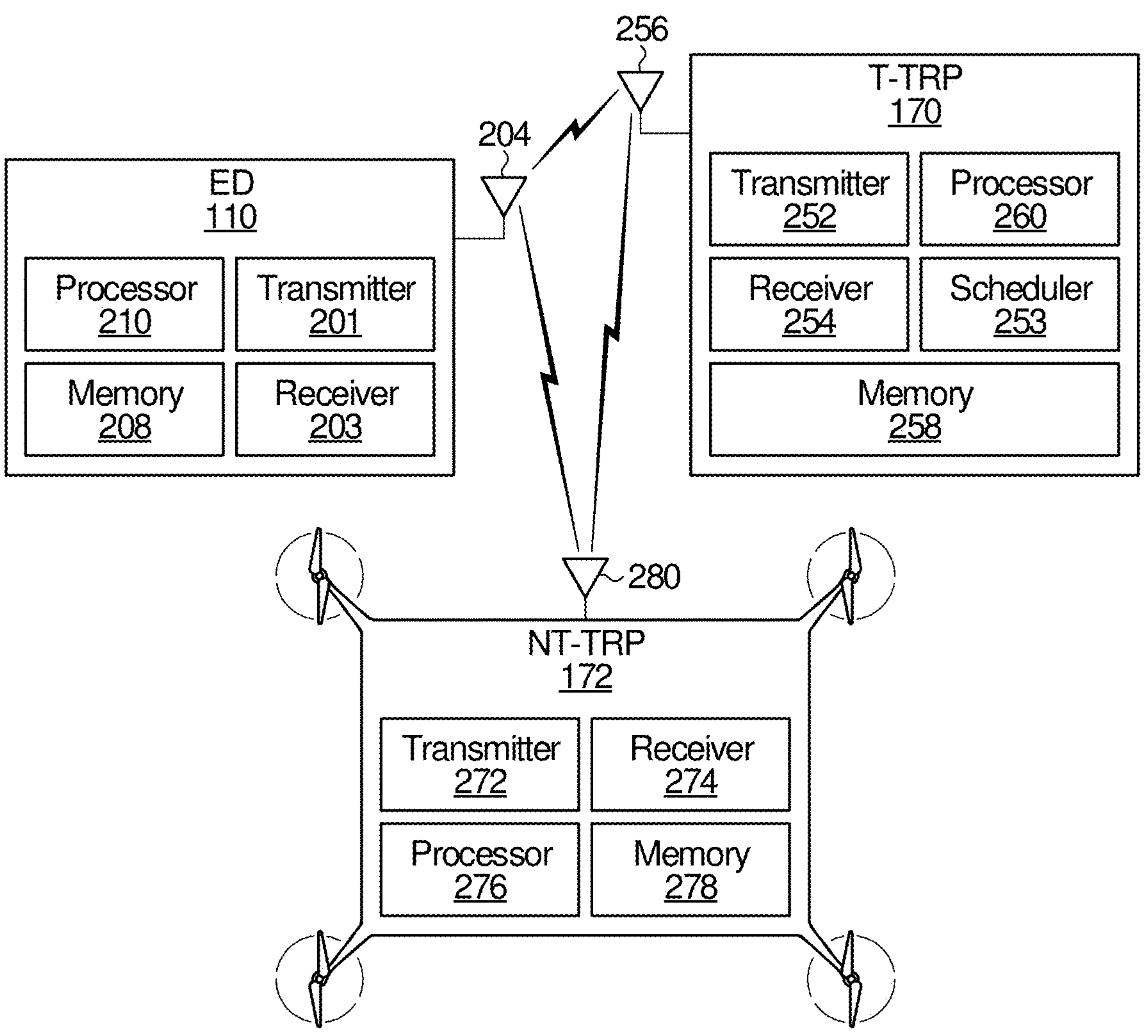
FIG. 2 is a block diagram illustrating example electronic devices and network devices.

FIGS. 1A, 1B, and 2 provide context for the network and devices of a wireless communication system that may implement aspects of the mobility management methods of the present disclosure.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another, and may also or instead be connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

FIG. 1B illustrates an example wireless communication system 100 (hereinafter referred to as system 100) which includes a network in which embodiments of the inter-cell mobility management methods of present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

The communication system 100 may provide a wide range of communication services and applications (such as earth monitoring, remote sensing, passive sensing and positioning, navigation and tracking, autonomous delivery, and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered subsystems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such technologies.

The EDs 110*a*-110*c* communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110*a*-110*c* communication with one or more of the T-TRPs 170*a*-170*b* or NT-TRPs 172, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

FIG. 2 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 2, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one or more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1A or 1B). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices. While the figures and accompanying description of example and embodiments of the disclosure generally use the terms AP, BS, and AP or BS, it is to be understood that such device could be any of the types described above.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 3:
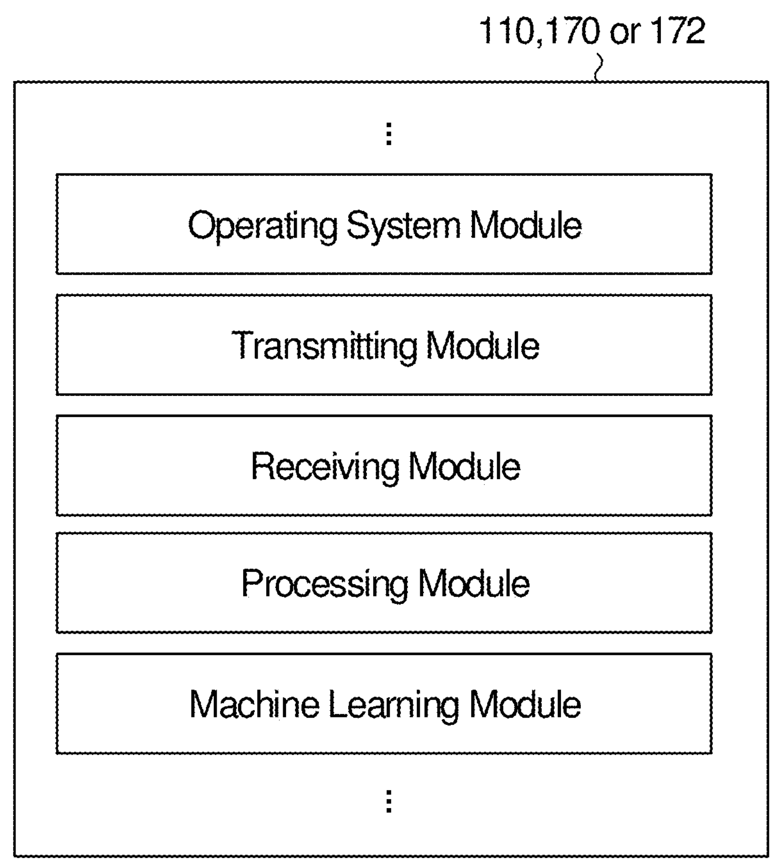
FIG. 3 is a block diagram illustrating units or modules in a device in which embodiments of the disclosure may occur.

One or more steps of the embodiment methods provided herein may be performed by corresponding units or modules, according to FIG. 3. FIG. 3 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

For future wireless networks, a number of the new devices could increase exponentially with diverse functionalities. Also, many new applications and new use cases in future wireless networks than existing in 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprises several framework, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be standalone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHZ, millimeter to Terahertz carrier frequency, from space, outdoor to indoor scenario, and from text, voice to video. These data collecting, processing and usage operations are performed in a unified framework or a different framework.

Performing analog beamforming of 2D beams from underlying 1D beams using a Kronecker product limits robustness capabilities of the 2D beam. Generation of 2D beams in such a manner potentially reduces robustness of the beam in a direction other than the directions presented by the underlying 1D beams. Only being able to transmit a beam in a direction based on the underlying 1D beams may result in a misalignment between a transmitter and receiver that may decrease beamforming gain and thereby result in a lower effective transmission rate.

An aspect of the present disclosure provides 2D chirp beamformers with robustness in any given direction and which is not limited to an underlying 1D beam direction. Another aspect of the present disclosure provides signalling that enables communication between a transmitter, such as a base station (BS) and a receiver, such as a user equipment (UE), for configuring a proposed 2D beamforming method and utilizing the beamformed beams.

Aspects of the present disclosure provide a method for generating chirp beams to be used by a 2D antenna array that enable the chirp beams to provide robustness in any given direction, as opposed to only underlying directions of 1D beams. Conventional designs for 2D chirp beams for a $N_1 \times N_2$ 2D antenna array, where $N_1$ and $N_2$ are integer values, of antenna elements that are spaced apart by half wavelength consist of four terms for the antenna indexed $n_1$ and $n_2$ ($n_1=1$ to $N_1$ and $n_2=1$ to $N_2$).

An equation that represents a 2D chirp function can be expressed as:

$$f(n_1, n_2) = e^{-j\pi n_1 \sin\theta_1} e^{-j\pi n_2 \sin\theta_2} e^{-j\pi\frac{u_1 n_1(n_1-N_1+1)}{N_1}} e^{-j\pi\frac{u_2 n_2(n_2-N_2+1)}{N_2}}.$$

The terms $e^{-j\pi n_1 \sin\theta_1}$ and $e^{-j\pi n_2 \sin\theta_2}$, which set a direction in which the beam is directed, are the same for any desired robustness. However, the terms $$e^{-j\pi\frac{u_1 n_1(n_1-N_1+1)}{N_1}} e^{-j\pi\frac{u_2 n_2(n_2-N_2+1)}{N_2}},$$

set the robustness in each direction of the underlying 1D beams.

Aspects of the present application propose generating a 2D beam that involves modifying the second two terms. Modifying these two terms in the proposed manner enables a robustness in an arbitrary direction instead of being limited to the underlying directions of the 1D beamformers. The second two terms are modified in the following manner $$e^{-\frac{j\pi u_1 d_1(d_1-D_1+1)}{D_1}} e\text{^}(-j\pi u\_2\, d\_2(d\_2-D\_2+1)/D\_2),$$

where $d_1$ and $d_2$ are new indices on axes rotated with respect to the original axes and that depends on the indices of the original axes $n_1$ and $n_2$. In this case, $D_1$ and $D_2$ represent the range of indices for the rotated axes.

One possible example for obtaining the new indices is, for robustness around $\theta_1$ and $\theta_2$, in an arbitrary direction of angle $\Phi$ rather than a direction of one of the respective 1D arrays. In such an example, to provide robustness in an area around the main angles of direction, the indices $n_1$ and $n_2$ are rotated by a rotation matrix in a direction $$\begin{bmatrix} \cos\Phi & -\sin\Phi \\ \sin\Phi & \cos\Phi \end{bmatrix}\begin{bmatrix} n_1 \\ n_2 \end{bmatrix}$$

ecause $n_1$ and $n_2$ range from 0 to $N_1-1$ and 0 to $N_2-1$, the indices $d_1$ and $d_2$ have to be shifted so that the indices start from 0 as well. This may be performed by subtracting a minimum value from each index value in a set of all indices in each dimension. Accordingly, the index of a first rotated axis, after the shift, will have the range from 0 to $D_1-1$, from which $D_1$ can be found. Similarly, $D_2$ can be obtained from the indices of the second rotated axis. Accordingly, based on the angle $\Phi$ that is used to provide robustness along a line rotated by an angle $\Phi$, the two sets of shifted indices may be obtained from the rotated axes, and the range of each set of indices may also be obtained. The angle $\Phi$, the shifted indices and the range of the shifted indices are all parameters that can be used to define a 2D beam having robustness for any given direction.

As a result, the overall beamformer for a 2D antenna array with a distance d between adjacent antenna elements, can be shown as $$\exp\left(-\frac{j2\pi d}{\lambda}\begin{bmatrix} n_1 & n_2 \end{bmatrix}\begin{bmatrix} \sin\theta_1 \\ \sin\theta_2 \end{bmatrix}\right) \times \exp\left(-\frac{j2\pi d}{\lambda}\begin{bmatrix} n_1 & n_2 \end{bmatrix}\begin{bmatrix} \cos\Phi & \sin\Phi \\ -\sin\Phi & \cos\Phi \end{bmatrix}\begin{bmatrix} \frac{u_1}{D_1} & 0 \\ 0 & \frac{u_2}{D_2} \end{bmatrix}\begin{bmatrix} \cos\Phi & -\sin\Phi \\ \sin\Phi & \cos\Phi \end{bmatrix}\begin{bmatrix} n_1 - N_1 + 1 \\ n_2 - N_2 + 1 \end{bmatrix}\right) \text{e beam coefficients,}$$

representing the combined phase for the antenna, can be manipulated to be expressed as $$\exp\left(-j\left(\alpha_1 n_1 + \alpha_2 n_2 + \beta_{11} n_1^2 + \beta_{22} n_2^2 + 2\beta_{12} n_1 n_2\right)\right)$$

where parameters $\alpha$ and $\beta$ collectively determine the direction, beam width, shape and orientation of the resulting beam. In the case of a discrete Fourier transform based beamformer, the quadratic phase terms shown by $\beta$ coefficients are equal to 0.

In some embodiments, the shifted indices $d_1$ and $d_2$ may be a polar representation of Cartesian dimensions represented by $n_1$ and $n_2$. In such a case, robustness may be provided along an arc, either towards or away from a centre point.

In general, the shifted indices $d_1$ and $d_2$ may be any function of $n_1$ and $n_2$. However a choice of the function may depend on a desired robustness and a particular shape of the robustness.

Some embodiments of the disclosure provide a method of analog beamforming of a signal. The method involves beamforming the signal to be transmitted by an array of antennas where the beamforming involves applying beam coefficients to the array of antennas. The beam coefficients pertain to beam direction and beam robustness information. Applying the beam coefficients involves adjusting the beam coefficients to obtain robustness in any direction, as compared to only in a direction of an underlying 1D beam. The beam coefficients may include one or more beam parameters such as angles defining a beam direction, parameters defining a beam width, a shape representing the robustness shape and parameters defining sidelobe levels or windowing functions. The beam coefficients may also include BS capabilities such as indications as to whether the BS has a 1D or a 2D antenna array and an ability for multi beam communications.

In some embodiments, the beam coefficients include a chirp beam sequence, each element of the chirp beam sequence having an associated phase value. The phases of the elements of the chirp beam sequence that determine a beam direction are a linear function of antenna indices of antennas of the array of antennas and the phases of the chirp beam sequence that determine the beam robustness are a polynomial function of the antenna indices.

In some embodiments, the antenna array is for a rectangular array of $N_1 \times N_2$ antennas that are half wavelength separated and the antennas of the array are aligned with a first perpendicular axes. Applying the beam coefficients may further include determining beamforming matrix coefficients for the $N_1 \times N_2$ antennas, wherein the beamforming matrix coefficients are determined based on $$e^{-j\pi n_1 sin\theta_1} \times e^{-\frac{j\pi u_1 d_1 (d_1 - D_1 + 1)}{D_1}} \times e^{-j\pi n_2 sin\,\theta_2} \times e^{-\frac{j\pi u_2 d_2 (d_2 - D_2 + 1)}{D_2}},$$

wherein $n_1$ and $n_2$ are indices of the $N_1 \times N_2$ antennas on the first perpendicular axes, angles $\theta_1$ and $\theta_2$ are the impinging beam angles with respect to the axes of the array of $N_1 \times N_2$ antennas, $d_1$ and $d_2$ are indices of the $N_1 \times N_2$ antennas on a second axes, $D_1$ and $D_2$ represent the range of indices for the second axes, and $u_1$ and $u_2$ are related to a beamwidth of a beamformed signal.

In some embodiments, a direction of robustness is defined by a mapping of the indices $n_1$ and $n_2$ associated with the first axis to the indices $d_1$ and $d_2$ associated with the second axis. Example of the direction of robustness may include, but are not limited to, a straight line, a curve, or an arc.

In some embodiments, the beam coefficients are calculated when needed based on BS capability and/or chirp beam parameter information and/or UE sensing/feedback information provided by the UE or obtained by the base station. In some embodiments, the beam coefficients are stored in a look up table and can be accessed when needed based on BS capability and/or chirp beam parameter information and/or UE sensing/feedback information provided by the UE or obtained by the base station.

In some embodiments, methods for signalling are provided that enable using 2D chirp beams during communication according to aspects described above. The signalling may be from a transmitter, which may be a BS or a UE, to a receiver, which may be a BS or a UE. The signalling may include beam parameter information or information that affects the beamforming design. While examples described below generally correspond to examples that may be used in downlink (DL) communications, i.e., from a BS to a UE, embodiments of the disclosure can be used for any type of communication link, such as uplink (UL), sidelink or backhaul. In some embodiments, a system to which embodiments of the disclosure may be applied use frequency division duplexing (FDD). In some embodiments, a system to which embodiments of the disclosure may be applied use time division duplexing (TDD).

Examples of beamforming methods described below are described for beamforming between a UE and a BS. The BS and/or the UE may be a satellite, a drone, a vehicle, a device of the internet of things (IoT), etc., which is capable of analog beamforming. In general, aspects of the present disclosure relate to any type of device that is capable of analog beamforming.

Figure 4A:
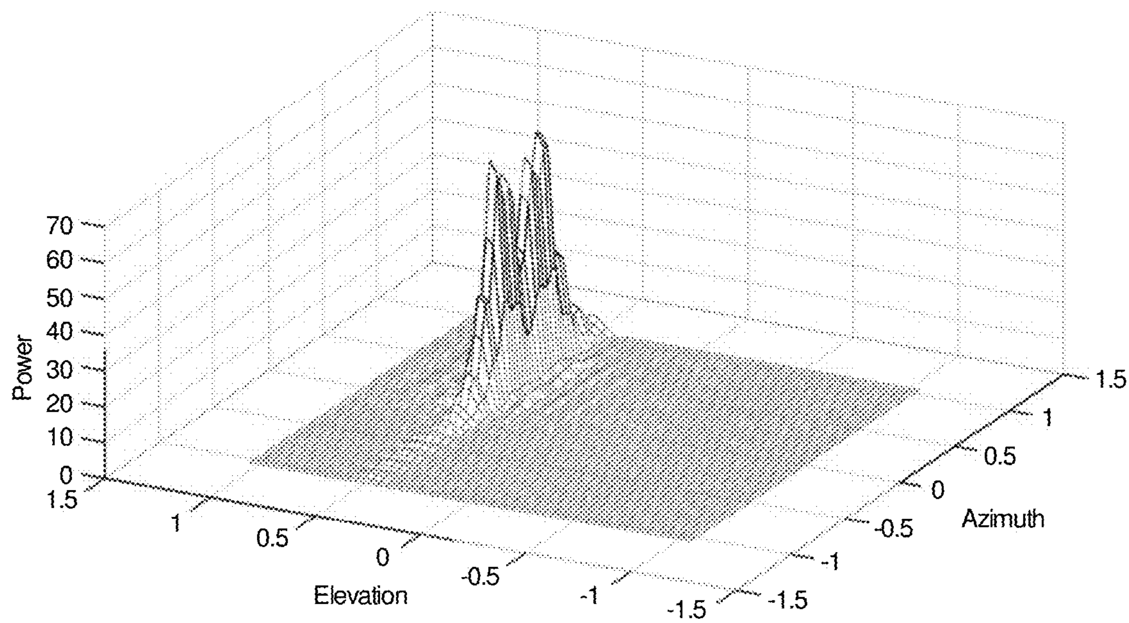
FIGS. 4A, 4B, 4C and 4D are examples of simulated analog beamformed beams that have been generated to provide robustness in any direction and in the case of FIG. 4D, a curved shape.
Figure 4B:
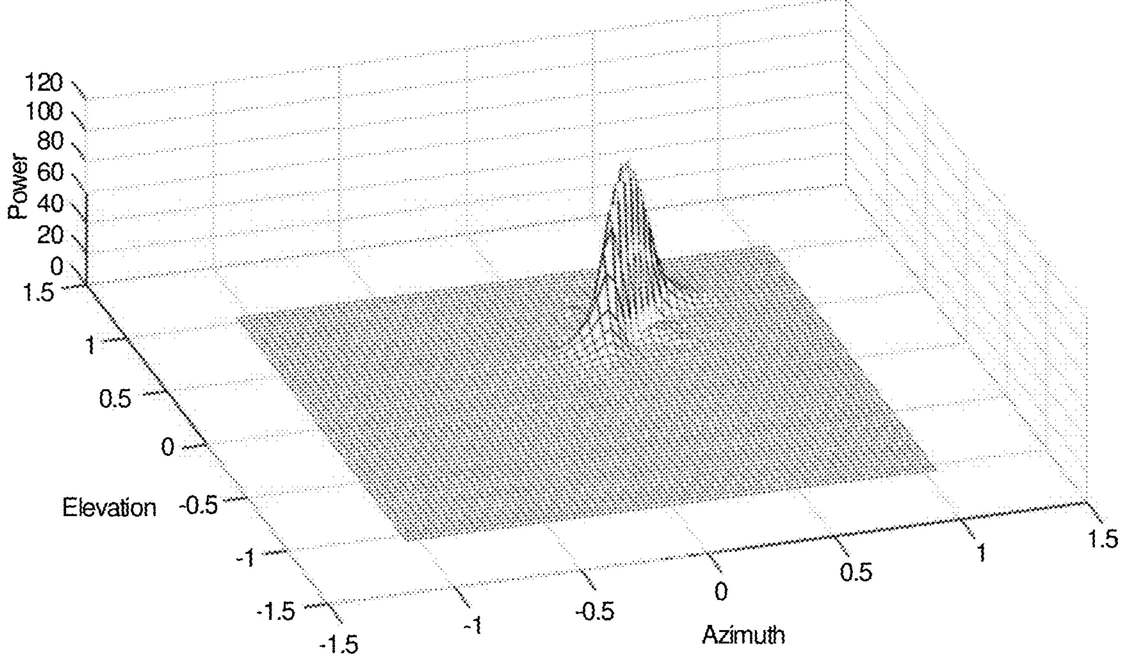
Figure 4C:
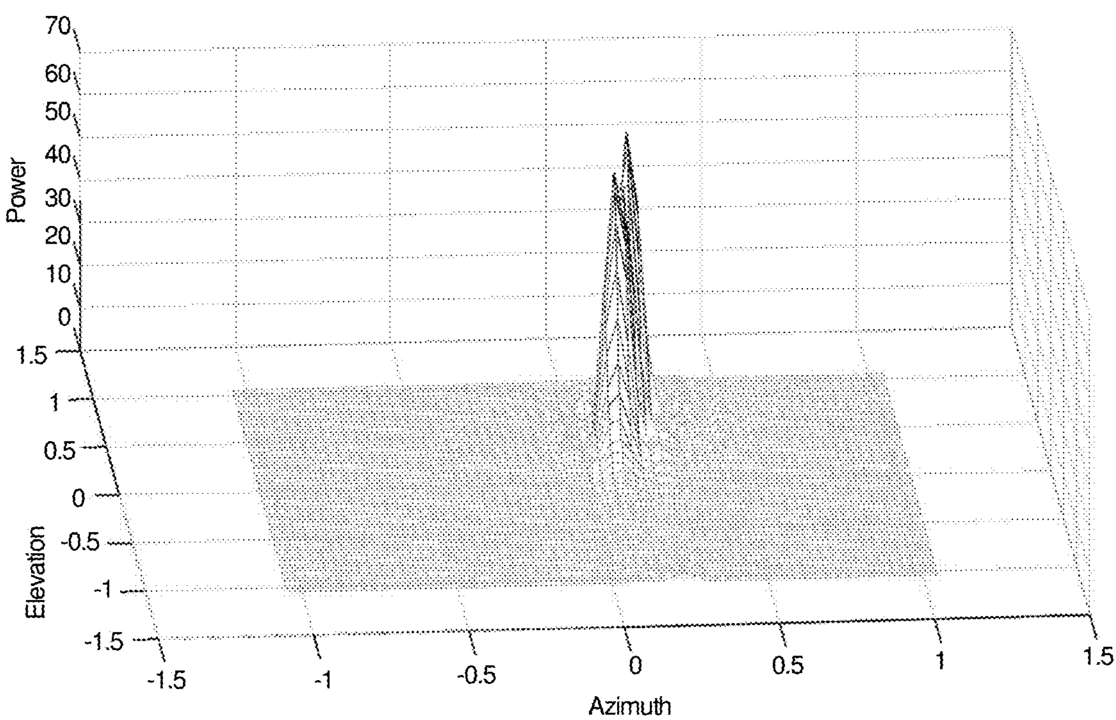

FIGS. 4A, 4B, 4C and 4D illustrate simulated examples of results of beamforming for which the chirp beam is modified to result in robustness in an arbitrary direction for a straight line or a curved line. FIGS. 4A, 4B and 4C are simulated examples that illustrate a beam having robustness along a line of an arbitrary direction. A centre line of the direction of robustness is different from one figure to another. FIGS. 4A, 4B and 4C show power resulting from power normalized single-path channels for different azimuth and elevation angles when received by a robust chirp beam of normalized power for a particular example of a 20 by 20 antenna array.

Figure 4D:
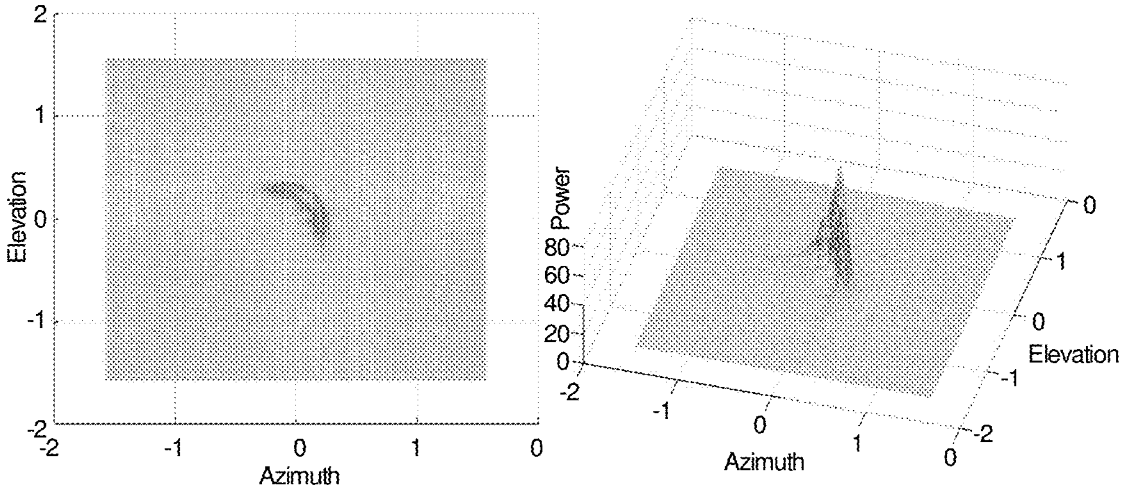

FIG. 4A shows robustness along a range of azimuth angles, with a fixed elevation angle. This can be obtained using conventional chirp beams since robustness is along one of the underlying 1D beams. FIG. 4B shows robustness along a line that has an angle of 45 degrees with respect to the azimuth axis, in which robustness is expressed for different pairs of elevation and azimuth angles that are along a line that makes 45 degrees with respect to a line of constant elevation angle. FIG. 4C shows robustness along a line that has an angle of 81 degrees with respect to a line of constant elevation angle. FIG. 4D is a simulation that shows robustness, however, the robustness occurs along an arc instead of a straight line.

In order to utilize a modified chirp beam for data or control signaling between the BS and UE in the DL direction, the UE may provide configuration information pertaining to a desired robustness at the UE. The information may be chirp beam parameter information or UE sensing information that the BS may use in generating the modified chirp beam so that the modified chirp beam is appropriate, and ideally optimized, for the UE.

The BS may be informed of the chirp beam parameters directly, or information that may be used by the BS to obtain the chirp beam parameters. The UE sends the configuration information on a control channel using signaling such as radio resource control (RRC) or a media access control control element (MAC-CE). The control channel may be a physical uplink control channel (PUCCH).

The configuration information that the UE sends may be based on the sensing information about the environment around the UE that may have been provided to the UE at some point in time or that the UE has been obtained by performing sensing of UE environment. Some examples of sensing information include, but not limited to, the velocity of the UE, an expected trajectory of the UE (for example, for vehicular users this may include road topography), a location of the UE with respect to the BS, an uncertainty in the UE sensing estimates (for example, an uncertainty of the location or the velocity of the UE), a required reliability for the transmission, and capabilities of the BS. In some embodiments, some chirp beam parameters may include default values. These default values might be suitable for a wide range of UEs, and, in such a case, the UE may update the robustness information less often decreasing, as a result communication overhead.

The chirp beam parameters related to 2D chirp beams may include parameter information such as angles defining a beam direction, a beam width, and a target robustness. If there are multiple beams there may be chirp beam parameter information provided for each of the beams. In some embodiments, the side lobe levels of a beam can be adjusted using appropriate windowing; e.g., Hamming or Hanning windowing.

In some embodiments, the configuration information may depend on a beam management process. For example, the configuration information may depend on whether the configuration information is going to be used for beam initial access (IA), beam refinement and tracking, or beam failure recovery. The configuration information may also depend on whether the beam is being used for control or data communication or is being used for unicast/multicast or broadcast transmission, or is being used for multi-beam transmission.

In some embodiments, other factors may indirectly affect a selection of the chirp beam related parameters. For example, overhead timing for beam management may affect the selection of parameters in a manner that provides a faster beam management process. One example is using wider beams for beam sweeping to allow for fewer beams for a same amount of angular search, decreasing the time used for beam management. Another example is hardware used for beam management. For instance, resolution of a digital phase shifter might affect a beam width, and this might be taken into consideration during beam design if the UE sends this information to the BS. In some embodiments, other factors related to the bandwidth to be used might affect the beam design. For example, beam squint may happen for wide band transmission, which may suggest using a certain beam width for optimal performance. Beam squint is an unfocusing of the antenna array across frequency when phase shift is used to steer the beam, instead of a true time delay In some embodiments, the chirp beam related UE specific information or chirp beam parameters may be sent by the UE directly. In some embodiments, the chirp beam related UE specific information or chirp beam parameters may be sent as a reply, or proposed modifications to information or parameters that were previously sent to the UE by the BS related to the chirp beam that will be transmitted by the BS.

In some embodiments, the UE may recommend parameters for more than one beam. For example, the UE may recommend one beam for initial communication and another beam for use in refined beam sweeping. In cases where the UE is communicating with the BS with more than one beam, the UE may recommend parameters for each beam. In multi-beam communication, one or more beams may be for control purposes. In addition, the UE might recommend different beam parameters for fall back beam recovery, which can be used to restore the communication or control if signal is lost.

While the UE may send information or parameters to the BS so that the BS provides chirp beams that are better suited to the UE needs, it is to be understood that the UE may also send such information or parameters to the BS regarding UE chirp beam management when the UE is capable of analog beamforming thereby advising the BS of information the BS may find helpful in receiving a signal that has been beam formed by the UE.

Figure 5:
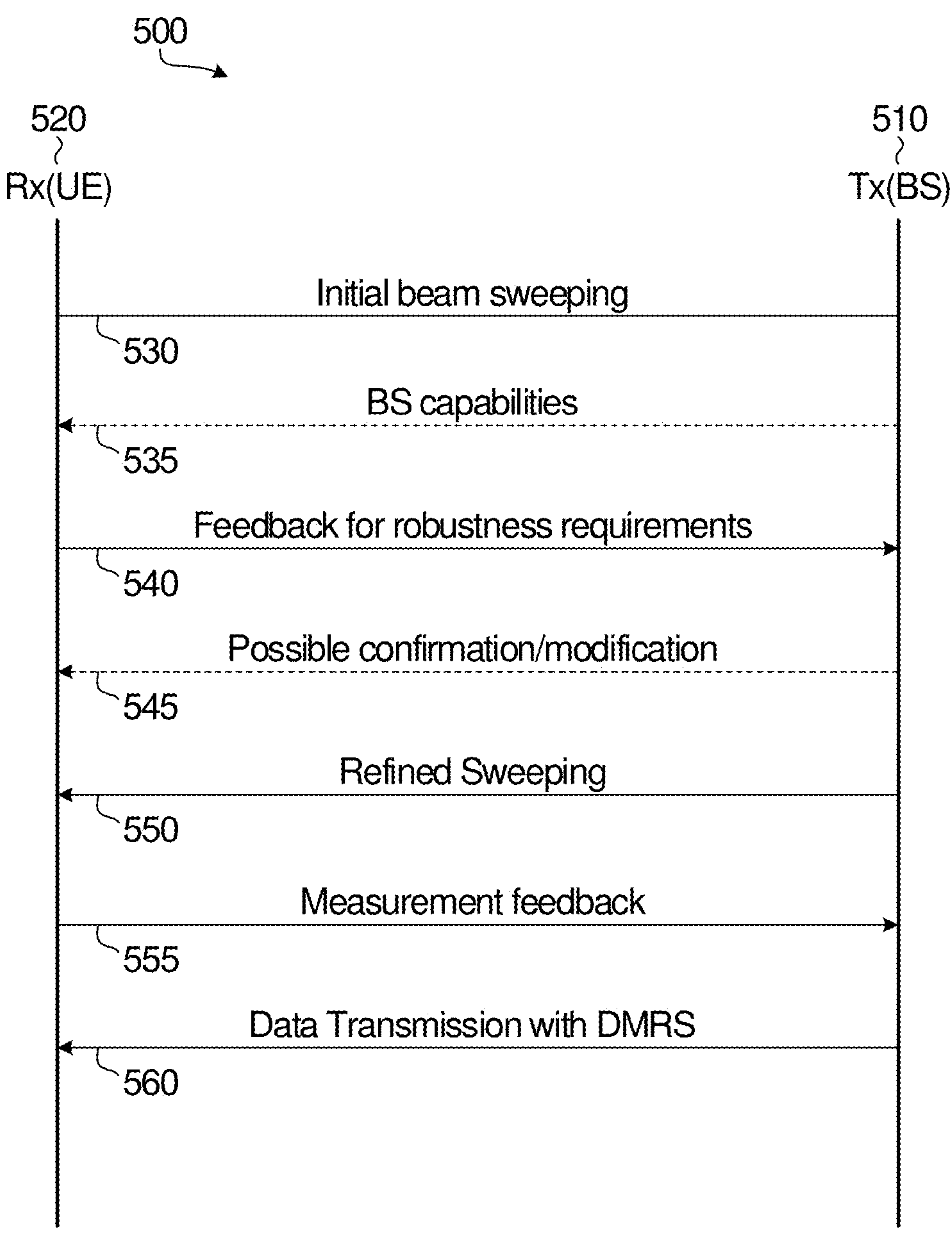
FIG. 5 is an example of a signaling flow diagram for signaling between a base station and a user equipment (UE) in which the UE sends chirp beam parameter information and/or UE robustness information to the base station according to an aspect of the present disclosure.

FIG. 5 illustrates an example signal flow diagram 500 of signaling that may occur between a transmitter, in the form of base station (BS) 510, and a receiver in the form of a UE, 520. In FIG. 5, the UE 520 suggests certain beam parameters for desired robustness following an initial beam sweeping in a DL scenario.

As an initial step 530, beam sweeping may be performed between the BS 510 and the UE 520. This initial beam sweeping may be multiple steps of signaling between the BS 510 and the UE 520 which are well known and therefore not expanded upon here.

The BS 510, may optionally (as indicated by the dashed line) send 535 signaling to the UE 520 that includes capability information or beam parameter information about the BS 510. The signaling may be sent on RRC, such as PDCCH. This may include one or more beam parameters such as angles defining a beam direction, parameters defining a beam width, a shape representing the robustness shape and parameters defining sidelobe levels or windowing functions. In can also include BS capabilities such as indications as to whether the BS has a 1D or a 2D antenna array and an ability for multi beam communications. Examples of the beam parameter information, which may also be referred to as robustness information, pertaining to chirp beams includes an identification of a beam or beam parameter information that can be used by the UE 520 to allow the UE 520 to determine identification of a beam.

The UE 520 sends 540 feedback information to the BS 510 that may include information that may aid the BS 510 in determining a chirp beam that provides a robust beam between the BS 510 and the UE 520. The signaling may be sent on RRC, such as physical uplink control channel (PUCCH). The parameters suggested by the UE 520, in this specific example, are considered for refined sweeping. This may include one or more beam parameters or UE sensing information described above such as information pertaining to a desired robustness at the UE, sensing information about the environment around the UE 520 that may have been provided to the UE 520 at some point in time or that the UE 520 has been obtained by performing sensing of UE environment, parameter information such as angles defining a beam center; parameters defining a beam width; a shape representing a desired robustness shape; parameters defining sidelobe levels; windowing functions, an indication of whether one or more beams may be used and for what purpose, a velocity of the UE, a direction of movement of the UE, a location of the UE, interference measured at the UE, a signal-to-noise ratio calculated at the UE, and uncertainty of one or more of the velocity of the UE, the direction of movement of the UE, the location of the UE, interference measured at the UE or the signal-to-noise ratio calculated at the UE. If the BS 510 has sent the optional BS capability information, the feedback information sent by the UE 520 may be influenced by that BS capability information.

The BS 510, may optionally (as indicated by the dashed line) send 545 signaling to the UE 520 on RRC, such as PDCCH that is a confirmation of the parameter information sent 540 by the UE 520, or a modification of the information initially sent 535 by the BS 510 or the feedback information sent 540 by the UE 520, if the feedback information sent by the UE 520 potentially changes how the BS 510 may generate a chirp beam being subsequently sent to the UE 510. The signaling may be sent on RRC, such as PDCCH.

The BS 510 performs refined beam sweeping 550 which involves the BS 510 transmitting reference signals based at least in part on the feedback received from the UE 520 and the UE 520 measuring the received reference signals to generate feedback to send to the BS 510 based on the reference signals.

Based on the measured reference signals as part of refined beam sweeping 550, the UE 520 sends 555 the feedback to the BS 510.

The BS 510 uses the feedback received from the UE 520 to determine a chirp beam to transmit data or control information to the UE 520. The BS 510 transmits 560 data that includes DMRS to the UE 520. The signaling may be sent on RRC, such as physical downlink shared channel (PDSCH).

In some embodiments, when the UE is sending chirp beam parameter information to the BS the UE informs the BS regarding a desired beam width for a chirp beam. In some embodiments, the information regarding chirp beam beam width depends on whether the BS has a 1D antenna array or a 2D antenna array. In some embodiments, the capabilities of the BS may be indicated to the UE before the UE specifies the beam parameters. In some embodiments, the UE may indicate the beam parameters to the BS and the BS modifies these parameters according to BS's capabilities.

For beams used in a 2D antenna array, the beam width of different beams can be independently adjusted. The direction for which robustness is being used for the UE may be any linear direction, such as in a direction of either of the underlying 1D beamforms or in a rotated direction. The robustness direction may also be an arc, or any other shape.

The beam width may be expressed in several ways. In some embodiments, the beam width in the feedback information sent by the UE may be expressed in degrees (or other angular measures like radians or gradians). In some embodiments, the beam width may be expressed as beam parameters that can be directly used by the BS. As an example, when using chirp beams as discussed above, the parameters $u_1$ and $u_2$ can be used to define the beam width along the axes of the antenna indices. In some embodiments, the beam width may be expressed in an indirect way. For example, by the UE sending information of one or more locations from which the BS may determine the beam width. In some embodiments, the UE may send the UE velocity, and the BS uses the UE velocity, among other parameters, to determine a suitable beam width and beam orientation. In some embodiments, the BS may use the velocity of the UE to determine a direction using information about the local environment, such as a floor plan or road topography. In some embodiments, the feedback information may include a 3D velocity vector.

In a particular example, the UE is travelling on a highway and requests robustness in a direction that the UE is moving on. This direction may not be along one of the underlying 1D beam directions of the 2D BS antenna array, but rather in a linear direction other than one of the underlying 1D beam directions. Based on the direction information the BS can modify the chirp beam as described above to send a chirp beam in a direction requested by the UE. In another practical example, the UE is inside a building and the UE requests robustness along a floor of the building that the UE is on, or a direction of a hallway the UE is passing.

As part of the chirp beam parameter information, the UE may request a wider or a narrower beam. Such a request may be made as a result of UE sensing inputs and operating boundaries and/or BS capabilities. For example, the UE may prefer a wider beam when moving at higher velocities due to higher sensitivity of beam direction at higher speed. A choice of the beam width may also depend on such factors as a direction of UE movement, whether the UE is in close proximity to the BS or the UE is moving toward or away from the BS. In some embodiments, the choice of the beam width may be location dependent. When the UE is close to the BS the UE experiences less path loss and higher beam direction sensitivity due to the short distance and so the UE does not need to use high gain narrow beams and may request a wider beam. In some embodiments, the choice of beam width may also depend on uncertainty of the sensing information being relied upon by the UE. Because the beam width may affect the robustness of communication, in some embodiments the robustness desired by applications such as texting, internet, browsing being used at the UE might affect the choice of beam width.

As part of the chirp beam parameter information, in some embodiments the UE recommends different beam widths for at least one beam. For example, the UE may recommend one beam width for initial communication and a different beam width for use in refinement beam sweeping. In situations where the UE is communicating with the BS with more than one beam, the UE may recommend a different beam width for beams used for different purposes. In multi-beam communication, one or more beams may be for control purposes or types of control information.

In some embodiments, the choice of the beam width may affect how the UE responds in certain scenarios. For example, if a UE selects a wide beam, when the signal to noise ratio (SNR) suddenly drops, the UE may assume that the signal has been blocked and as a result the UE may trigger beam recovery. However, if the UE has chosen a narrow beam, when the SNR suddenly drops, the UE may assume that the beam needs updating since small angular movements can cause the SNR to rapidly drop. Accordingly, the choice of the beam width may affect how the UE performs beam management.

The choice of the beam width may be indirectly related with other factors. For example, the UE moving towards the BS would benefit from use of a narrow beam, but as a result incurs a higher Doppler shift. On the other hand, a UE that is moving along a circle for which the center point is the BS may prefer a wider beam and would as a result see almost no Doppler shift.

In some embodiments, the UE might recommend a different beam width for fall back beam recovery. Fall back beam recovery may be used to restore communication, or control signaling, if the signal between the UE and BS is disrupted.

Figure 6:
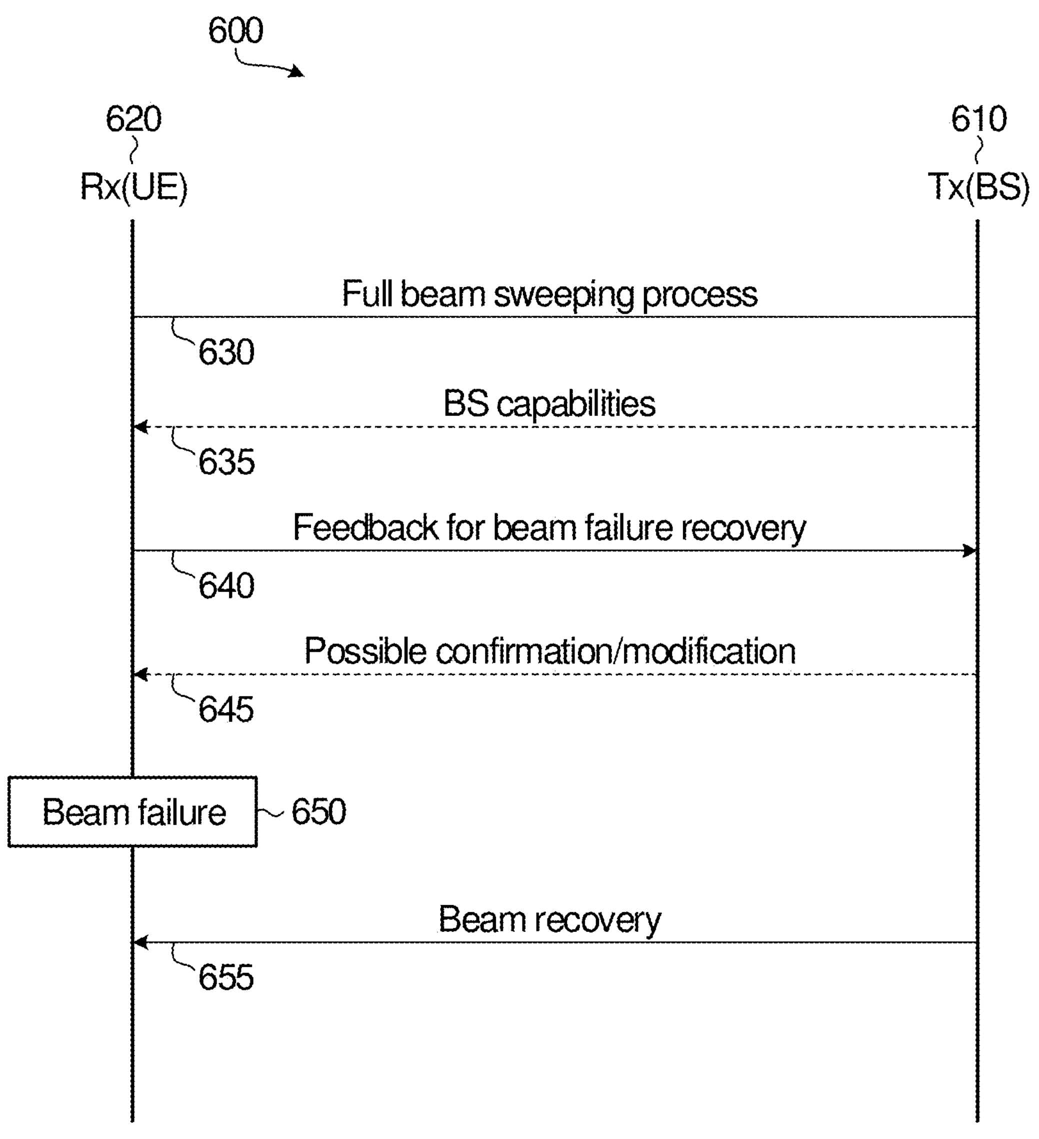
FIG. 6 is another example of a signaling flow diagram for signaling between a base station and a UE in which the UE sends chirp beam parameter information and/or UE robustness information to the base station according to an aspect of the present disclosure.

FIG. 6 illustrates an example signal flow diagram 600 of signaling that may occur between a BS 610 and a UE 620 in which the UE 620 suggests certain beam parameters for possible fall back recovery during a DL scenario. The BS 610 uses these beam parameters to re-establish the connection with the UE 620 when a beam failure occurs and is detected by the UE 620.

As an initial step 630, beam sweeping may be performed between the BS 610 and the UE 620. The beam sweeping may be initial beam sweeping or refinement beam sweeping. The beam sweeping may be multiple steps of signaling between the BS 610 and the UE 620 which are well known and therefore not expanded upon here.

The BS 610 may optionally (as indicated by the dashed line) send 635 signaling to the UE 620 that includes capability information about the BS 610. The signaling may be sent on RRC, such as PDCCH.

The UE 620 sends 640 feedback information to the BS 610, such as the PUCCH that includes information that may aid the BS 610 in determining a chirp beam that provides a robust beam between the BS 610 and the UE 620 for channel recovery. The signaling may be sent on RRC, such as PUCCH. This may include one or more beam parameters or UE sensing information described above such as information pertaining to a desired robustness at the UE 620, sensing information about the environment around the UE 620 that may have been provided to the UE 620 at some point in time or that the UE 620 has been obtained by performing sensing of UE environment, parameter information such as angles defining a beam peak or center, a beam width, and a target robustness, an indication of whether one or more beams may be used. If the BS 610 has sent the optional BS capability information, the feedback information send by the UE 620 may be influenced by that BS capability information.

The BS 610, may optionally (as indicated by the dashed line) send 645 signaling to the UE 620 that is a confirmation of the parameter information send by the UE 620, or a modification of the information initially sent 635 by the BS 610 or the feedback information sent 640 by the UE 620, if the feedback information sent by the UE 620 potentially changes how the BS 610 will generate a chirp beam being subsequently sent to the UE 620. The signaling may be sent on RRC, such as PDCCH.

When a beam failure is detected 650 between the BS 610 and UE 620, the BS 610 can use the feedback information received from the UE 620 to perform beam recovery 655.

While the feedback information sent 640 is described as being particular to beam failure recovery, it is to be understood that this beam recovery information may be sent together with the feedback information sent in 540 in FIG. 5.

In some embodiments, the UE informing the BS about chirp beam parameter information involves the UE informing the BS regarding a desired shape of robustness resulting from a chirp beam.

In some embodiments, chirp beams transmitted by a 2D antenna may have robustness in different ways. For example, it may be desirable to have a robust beam along a line connecting two points where the first point is represented by angles describing a current location of the UE and the second point is represented by angles describing a location of the UE at a future point in time. Therefore, in such a case, the beam may be considered most robust along the line connecting the two points, which may represent the movement of the UE, and less robust in the perpendicular direction. In some embodiments, the two points may be used to determine boundaries of a likely location of the UE. An example of this may be when the UE is on a known road, but the sensing information accuracy and information aging leaves uncertainty as to the exact location. Information aging refers to information from previous time slots, which may contain information about the UE at earlier times. In some embodiments, the robustness may be along two points that are connected by an arc; e.g., arc on a circle. Accordingly, the UE may inform the BS of a particular shape that would provide robustness in addition to the beam width along and perpendicular to that shape. One possible way is to provide information indicating the shape of curvature; e.g., a line or an arc of a circle, in addition to information regarding rotation of the beam and a center of that shape of curvature. For the BS to understand the shape of desired robustness, the information sent by the UE has to be understood in terms of coordinates that are familiar to the BS. In a particular example, the BS and UE may agree that the information sent to the BS is based on global positioning system (GPS) coordinates, and accordingly, the BS will understand any information sent by the UE as information according to its GPS data.

In some embodiments, the information sent from the UE to the BS regarding the shape of desired robustness may be based on the sensing information at the UE, including the UE location and speed. The UE may also involve information from other sources; e.g., UE route information which may be from an application layer. In some embodiments, the shape of the desired robustness may also differ for a data beam as compared to a control beam.

When the UE provides the BS with parameters related to beam management or modifies the parameters initially set by the BS, the beams used at the BS may be better suited to the needs of the UE. When the beams used at the BS are better suited to the needs of the UE, this may enhance performance in terms of one or more metrics, e.g., throughput, reliability, lower overhead, etc.

In some embodiments, the UE may inform the BS about measurements related to chirp beam management. Examples will be described below illustrating the relation between particular measurements made by the UE and chirp beam parameters. Particular types of measurements made at the UE include SNR, signal and interference to noise ratio (SINR), interference, and power level. The measurements may result in changes in the chirp beam parameters that may benefit overall system performance.

In some embodiments, the UE informs the BS regarding interference levels that are observed at the UE. This may enable the BS to make changes to the chirp beams for the UE or other UEs nearby the UE to improve performance.

When the BS communicates with multiple UEs in a geographical area, beams for some UEs may affect other UEs due to localized interference. The interference at a UE might result from another UE that is quite close, in terms of angle, from the point of view of the BS, or when a UE is not as close to the BS, but the beam is wider. Once the BS is aware of potential interference, the BS might use one of multiple different techniques to reduce the interference. One technique may be that the BS uses a windowing technique to lower side lobes of beams being transmitted to neighbouring UEs such that the effect on the UE suffering from interference is reduced. Another technique is that the BS uses different beams or different beam parameters to service the neighbouring UEs such that the effect on the UE suffering from interference is reduced; e.g., use narrower beams. Another technique is that the BS might also use one of several different multiple access protocols to solve the interference problem; e.g., orthogonal frequency division multiple access (OFDMA), non-orthogonal multiple access (NOMA), and time divisional multiple access (TDMA).

Figure 7:
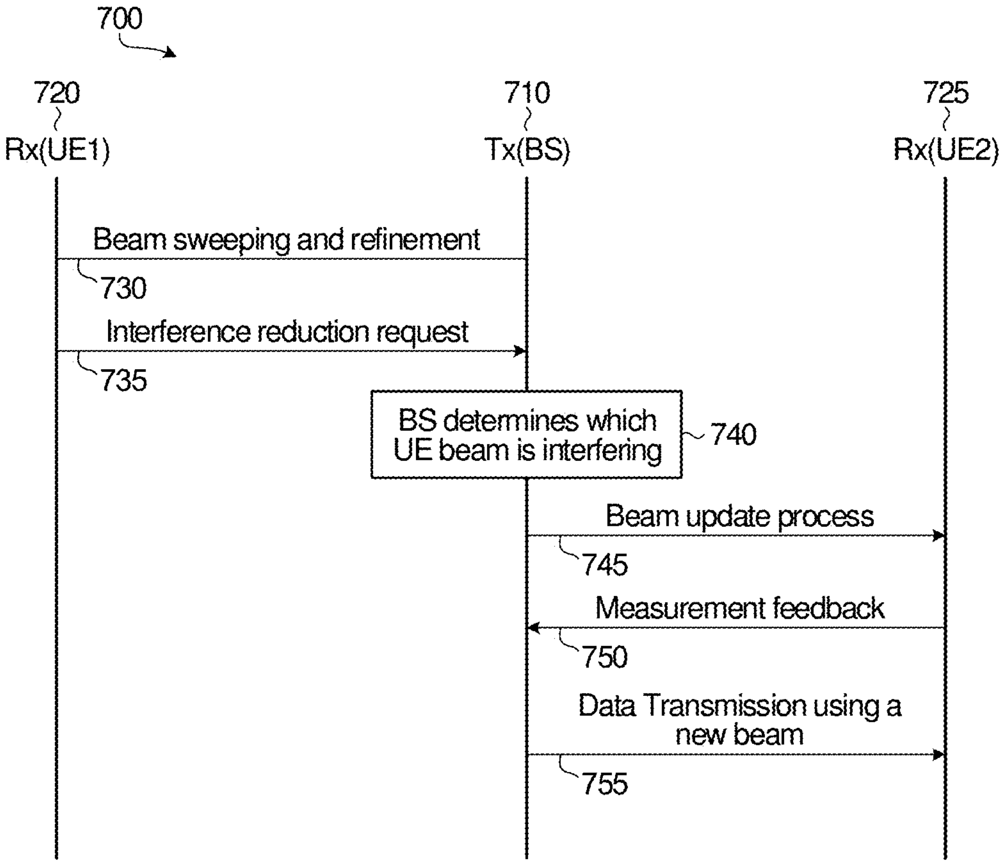
FIG. 7 is an example of a signaling flow diagram for signaling between a base station and two UEs in order to reduce signal interference according to an aspect of the present disclosure.

FIG. 7 illustrates an example signal flow diagram 700 of signaling that may occur between a BS 710, a first UE UE1 720 and a second UE UE2 725 in which UE1 720 sends a request to the BS 710 requesting interference reduction. The BS 710 determines which UE beam is possibly causing this interference, performs a beam update process with UE2 725, and then updates the beam used in communication with UE2 725 with a beam that should not cause as much interference with UE1 720.

As an initial step 730, beam sweeping and refinement may be performed between the BS 710 and UE1 720. This may be similar to step 550 in FIG. 5. Other steps similar to the steps that occur prior to step 550 in FIG. 5 may also be performed prior to the beam sweeping refinement 730 in FIG. 7.

UE1 720 sends 735 signaling to the BS 710 to request reduction of interference. The request may occur on RRC, such as PUCCH.

At step 740, the BS 710 determines which UE beam may be interfering with UE1 720. In this example the BS 710 determines that UE2 725 is potentially interfering with UE1 720. The BS 710 may make the determination by considering which other UEs appears to be in a similar direction to UE1 720.

The BS 710 performs 745 a beam update process for UE2 725 that includes sending reference signals to UE2 725 for UE2 725 to measure and provide feedback to the BS 710.

After UE2 725 has measured the reference signals and generated feedback information as part of the beam update process 745, UE2 725 sends 750 the feedback information to the BS 710.

The BS 710 uses the feedback received from UE2 725 to determine a chirp beam to transmit data or control information to UE2 725. The BS 710 transmits 755 data to UE2 725. The signaling may be sent on RRC, such as PDSCH.

In some embodiments, the BS 710 may determine that UE1 720 is having interference due to another BS that is communicating with another UE UE2 725. The BS 710 may communicate with that BS to request interference reduction for UE1 720. The other BS may coordinate with BS 710 to reduce the interference to UE1 720. This may include updating the chirp beam being used by UE2 725, using orthogonal frequency division multiple access or non-orthogonal multiple access or time division multiple access that is being coordinated between the two BSs.

In some embodiments, the UE informs the BS regarding SNR and/or SINR. In beamforming which does not include the ability to adaptively vary the beam width, the SNR may be obtained for a given beam and be considered constant for that beam. However, if the beam width varies, the corresponding SNR would likely vary as well, and the BS may benefit from a mapping between the SNR values and the different beam widths that are used. Such a mapping may result in a better selection of a modulation and coding scheme (MCS) that is used by the BS. In addition, varying of the beam width may also affect power control during uplink communication. Power control may be affected due to varying the beam width may change the SNR for that beam and therefore the power control may need updating. In some embodiments, when both the UE and the BS use analog beamforming, the impact of the beam width at both the UE and the BS may affect the resulting SNR.

When the UE provides measurements to the BS that are related to the chirp beams, the BS may modify the chirp beam parameters to enhance the communication between the BS and one or more UEs in the system. The enhancement can be in terms of metrics such as, but not limited to, higher transmission rates, lower interference, or more robust communication.

In some embodiments, the BS may inform the UE about one or more parameters that are related to the chirp beams used in beam management by the BS. In some embodiments, the UE may be informed of the beam parameters directly. In some embodiments, the UE may be informed of information that can be used by the UE to obtain the beam parameters. The BS can use a control channel e.g., RRC (or MAC-CE) to inform the UE about such parameters or the information that can be used by the UE to obtain the parameters.

The parameters or information that the BS sends to the UE may depend on sensing information that is available to, or is obtained at, the BS. The sensing information may include information regarding a location of the UE, a velocity of the UE and an expected trajectory for the UE (for example road topography for a vehicular), and uncertainty in estimates made by the BS. In some embodiments, the beam parameters may also depend on a desired reliability for the transmission. In some embodiments, the beam parameters may also depend on the capabilities of the BS. In some embodiments, some beam parameters may include default values. These default values may be suitable for a wide range of UEs, and in such a case, the BS may only update the default values less often, thereby decreasing communication overhead.

In some embodiments, selection of beam parameters may depend on the beam management process. The beam management process may pertain to what the beam is being used for such as beam initial access, beam refinement, beam tracking, or beam failure recovery. In some embodiments, selection of beam parameters may be related to whether the beam is being used for transmitting control or data communication or being used for unicast/multicast or broadcast transmission, or being used for multi-beam transmission.

In some embodiments, other factors may indirectly affect the choice for beam management parameters. For example, overhead timing for the beam management may affect the selection of parameters in a way to provide a faster process. Another factor may be the hardware used in beam management. For instance, the resolution of a digital phase shifter may affect the beam width. Other factors related to the band width being used may affect the chirp beam to be used. For example, beam squint may occur for wide band transmission, which may suggest selecting a particular beam width for optimal performance.

In some embodiments, the information or parameters may be sent as an initial step by the BS. In some embodiments, the information or parameters may be sent as a reply, or proposed modification, to feedback information or parameters that were sent by the UE. The parameters related to chirp beams for 2D antenna arrays may include angles defining the beam direction, beam width, and the designed robustness for one or more beams. In some embodiments, side lobe levels for the beam can be adjusted using appropriate windowing; e.g., Hamming or Hanning windowing.

The BS may send parameters for more than one beam. For example, the BS may use a first beam for initial communication and a second beam for refinement beam sweeping. In cases where the BS is communicating with the UE with more than one beam, the BS may use different parameters for each beam. In multi-beam communication, one or more beams may be for control purposes. In addition, the BS may use different beam parameter for fall back beam recovery for restoring the communication signaling or control signaling, if the signal is lost.

Since the BS typically communicates with many UEs, the BS may try to decrease potential interference. In beamforming, one way to do so is by reducing side lobes of the beam by windowing. The BS may try to reduce the side lobe level as long as such reduction does not contradict beam requirements for proper UE communication. There may be communication between the BS and UE to provide a preferred windowing operation.

While some embodiments are directed to the BS sending information or parameters to the UE so that the UE understands the way the BS is beamforming, it is to be understood that the BS might also send information or parameters to the UE regarding the chirp beam management to be used by the UE itself when the UE is capable of analog beamforming.

Figure 8:
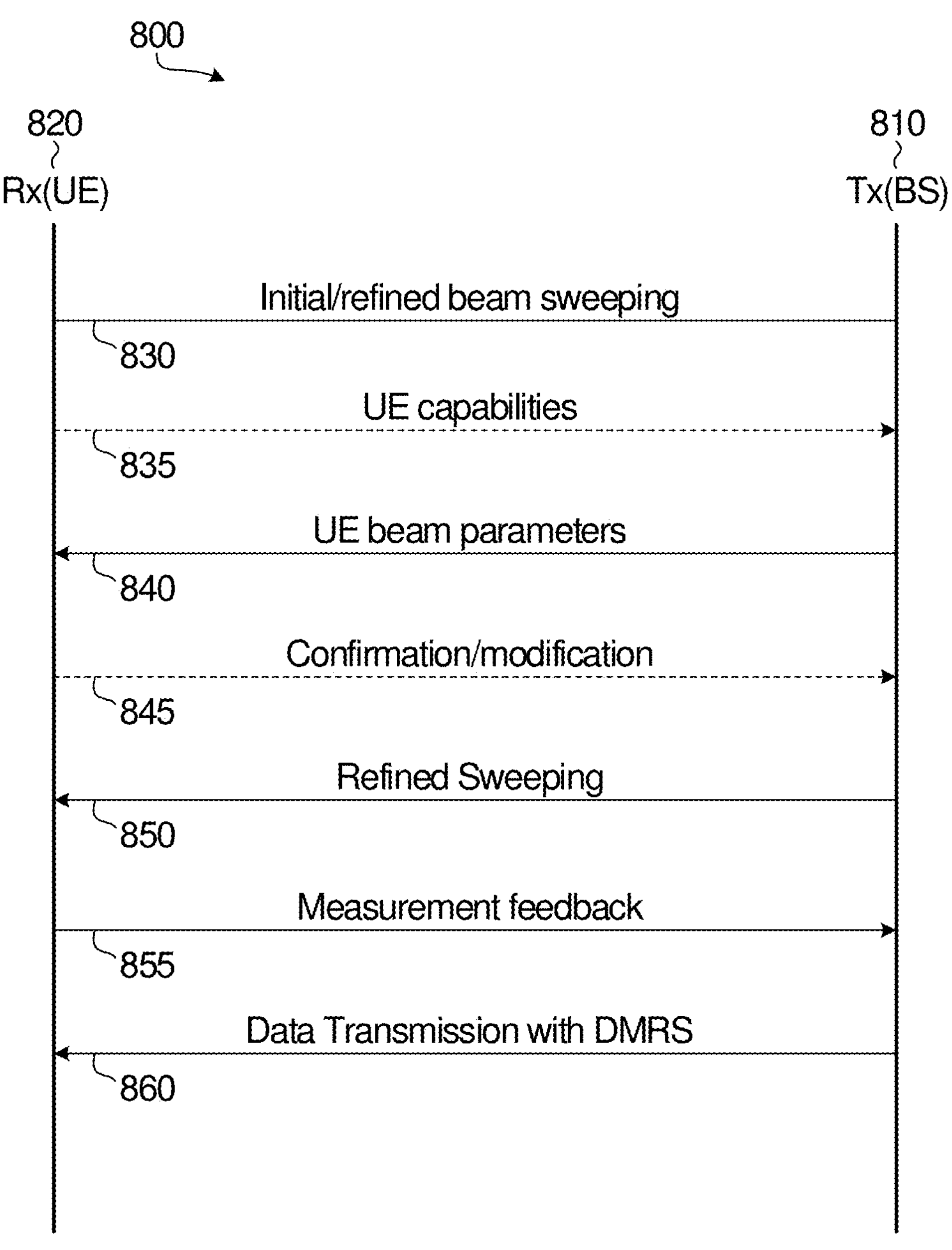
FIG. 8 is an example of a signaling flow diagram for signaling between a base station and a UE in which the base station sends beam parameter information and the UE may send feedback information to the base station according to an aspect of the present disclosure.

FIG. 8 illustrates an example signal flow diagram 800 of signaling that may occur between a BS 810 and a UE 820. In FIG. 8, the BS 810 communicates with the UE 820 regarding chirp beam parameters that are to be used by the UE 820 for beamforming. While some UEs have a low number of antennas in an antenna array, UEs used in the future may possibly have arrays containing many more antennas. While it may not be necessary to provide UE beam robustness when the BS is fixed, in some implementations, the BS is not fixed, such as when the BS is a drone or a low orbit satellite. Therefore, in some embodiments, providing UE beam robustness may increase communication reliability. If there is ambiguity in UE orientation, even if an absolute beam direction is known, there may be ambiguity regarding the beam direction relative to the UE antenna panels. In some embodiments, the parameters sent from the BS to the UE may include information such as the beam center, beam width and other information that affects robustness.

As an initial step 830, initial or refined beam sweeping may be performed between the BS 810 and the UE 820. Such beam sweeping may be multiple steps of signaling between the BS 810 and the UE 820 which are well known and therefore not expanded upon here.

The UE 820, may optionally (as indicated by the dashed line) send 835 signaling to the BS 810 that includes capability information about the UE 820. The signaling may be sent on RRC, such as PUCCH.

The BS 810 sends 840 UE beam parameter information to the UE 820 that includes information to inform the UE 820 how the UE 820 may determine a chirp beam that provides a robust beamforming between the BS 810 and the UE 820. In some embodiments, the beam parameter information may be sent on RRC, such as PDCCH.

The UE 820, may optionally (as indicated by the dashed line) send 845 signaling to the BS 810 that is a confirmation, or possible modification, of the information initially send 835 by the UE 820 or the UE beam parameter information sent 840 by the BS 810. The signaling may be sent on RRC, such as PUCCH.

The BS 810 performs refined beam sweeping 850 which involves the BS 810 transmitting reference signals and the UE 820 measuring the received reference signals.

Based on the measured reference signals, the UE 820 sends 855 feedback to the BS 810.

The BS 810 uses the feedback from the UE 820 to determine a beam to transmit data to the UE 820 and transmits data with DMRS to the UE 820. The signaling may be sent on RRC, such as PDSCH.

In some embodiments, the BS sends information to inform the UE regarding the beam width of the chirp beam. In some embodiments, the capabilities of the BS may be indicated to the UE in addition to other beam parameters. The information regarding chirp beam width may depend on whether the BS has a 1D antenna array or a 2D antenna array. For beams of a 2D antenna array, the beam width of each beam can be independently adjusted. The direction of desired robustness can be in any linear direction, such as in a direction of either of the underlying 1D beamforms or any other preferred direction. The robustness direction may also be an arc, or any other shape.

The BS may use different beam widths for different beams. For example, the BS may use a first beam width for initial communication and a second beam width for refinement beam sweeping. In cases where the BS is communicating with the UE with more than one beam, the BS may use a different beam width for each beam. In multi-beam communication, one or more beams may be used for control purposes. In addition, the BS may use different beam parameter for fall back beam recovery for restoring the data signaling or control signaling, if the signal is disrupted.

The BS may use the same beam for multi-user multiple access; e.g., OFDM or NOMA or TDMA. This may be useful for UEs that are close to one another in terms of angular direction from the perspective of the BS. In some embodiments, the same beam can be used for multi-cast or broad cast transmission.

When the BS informs the UE using a beam having a given beam width, the UE may use UE sensing information, e.g., the UE location and the UE velocity, to determine the robustness of the beam and whether the beam width is adequate or not. The UE may feedback information to the BS to update the beam width. The UE may use the UE sensing information and the beam width(s) to determine how often to update the beam.

Figure 9:
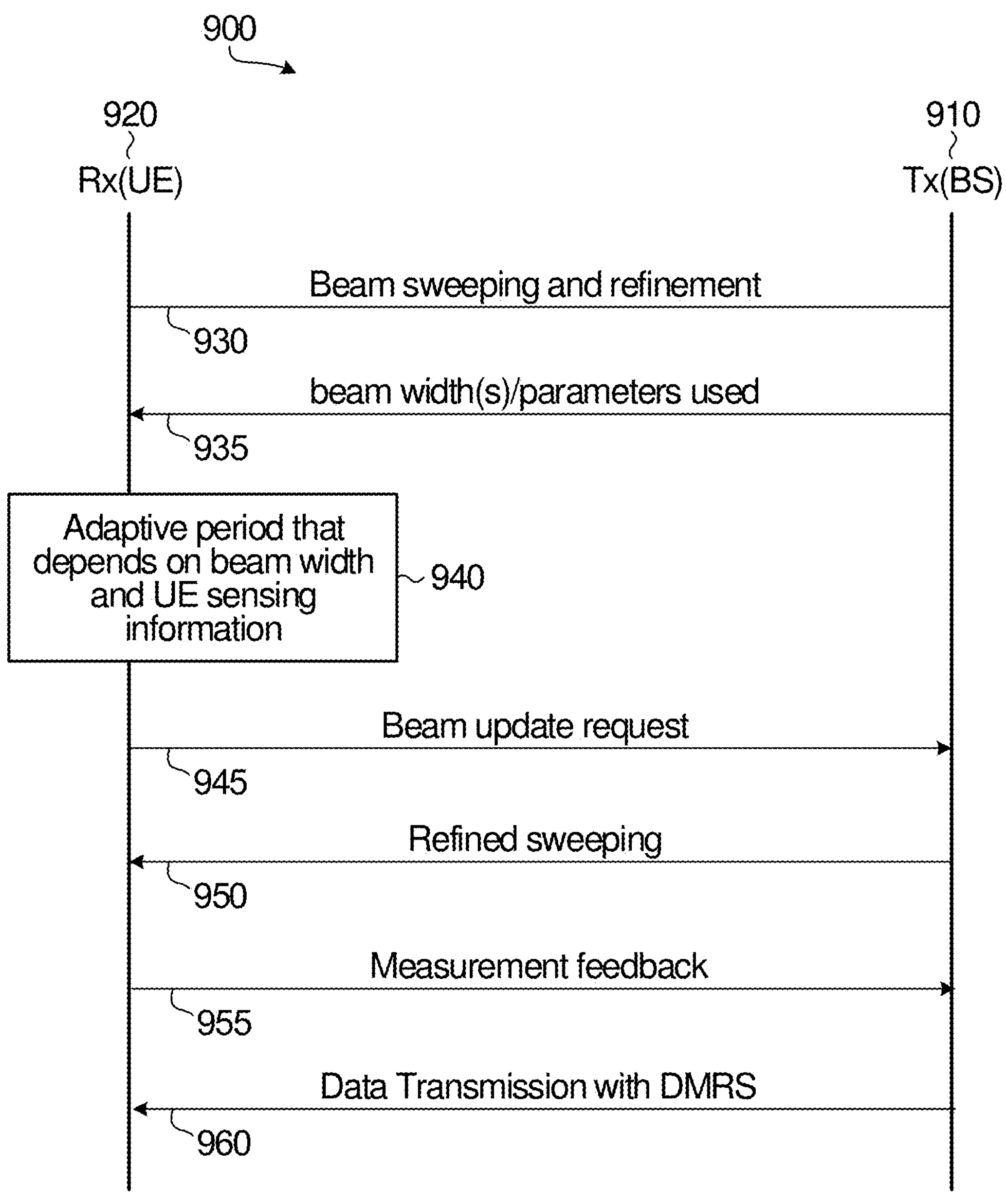
FIG. 9 is an example of a signaling flow diagram for signaling between a base station and a UE in which the UE sends a beam update request to the base station according to an aspect of the present disclosure.

FIG. 9 illustrates an example signal flow diagram 900 of signaling that may occur between a BS 910 and a UE 920. In FIG. 9, the BS 910 informs the UE 920 about beam parameters that are used in beamforming. The UE 910 checks the parameters, and either sends feedback in the form of a confirmation if the parameters match the UE requirements or sends modifications to better match the desired parameters for the UE 920. The BS 910 may consider the UE feedback when doing the beam management process. In some embodiments, the UE 920 considers the beam parameters and determines how often to update the beams used for data or control signaling based on the beam parameter information. This may help reduce overhead for beam management.

As an initial step 930, initial or refined beam sweeping may be performed between the BS 910 and the UE 920. Such beam sweeping may be multiple steps of signaling between the BS 910 and the UE 920 which are well known and therefore not expanded upon here.

The BS 910 sends 935 a transmission to the UE 920 using the beam parameter information. In some embodiments, the transmission may be performed using RRC.

At 940, there may be a period of time during which the UE 910 determines if the beam parameters require updating for the UE 920. The determination may depend on the beam width and UE sensing information.

If the beam parameters require updating, the UE 920 sends 945 a request for a beam update to the BS 910. The request may be sent on RRC, such as PUCCH. The beam update request causes the BS 910 to perform refined beam sweeping.

The BS 910 performs the refined beam sweeping 950 which involves the BS 910 transmitting reference signals with a beam that may have different beam parameters than used previously and the UE 920 measuring the received reference signals.

Based on the measured reference signals, the UE 920 sends 955 feedback to the BS 910.

The BS 910 uses the feedback from the UE 920 to determine a beam to transmit data to the UE 920 and transmits 960 data with DMRS to the UE 920. The request may be sent on RRC, such as the PDSCH.

The example shown in FIG. 9 may be applied to UL or DL.

In some embodiments, the BS sends information to the UE that informs the UE regarding the shape of robustness.

In some embodiments, chirp beams transmitted by a 2D antenna array may have robustness in different ways. For example, it may be desirable to have robustness along a line connecting two points where the first point is represented by angles describing a current location of the UE and the second point is represented by angles describing a location of the UE at a future point in time. Therefore, in such a case, the beam may be more robust along the line connecting the two points, which represents the movement of the UE, and less robust in the perpendicular direction. In some embodiments, the two points may be used to determine boundaries of a likely location of the UE. An example of this may be when the UE is on a known road, but the sensing information accuracy and information aging leaves uncertainty as to the exact location. In some embodiments, the robustness may be along two points that are connected by an arc; e.g., an arc on a circle. As such, in some embodiments, the BS may inform the UE of a particular shape in addition to the beam widths along and perpendicular to that shape. One possible way is to provide information indicating the shape of curvature; e.g., a line or an arc of a circle, in addition to information regarding rotation of the beam and a center of that shape. For the UE to understand the shape of robustness, the information sent by the BS has to be understood in terms of coordinates that will be familiar to the UE. For example, the BS and UE may agree that the information sent to the UE is based on GPS coordinates, and accordingly, the UE will understand any information sent by the UE as information according to its GPS data.

In general, after the UE receives the information regarding the shape of robustness from the BS, the UE may check whether this robustness is suited for the UE, and provide feedback to the BS that confirms the parameters are adequate or suggests modifications to the parameters.

In some embodiments, having the BS provide the UE information regarding the chirp beam parameters may help the UE determine whether a beam matches requirements of the UE or not and may allow the UE to feedback information to the BS when appropriate.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method performed at a side of a user equipment (UE) comprising:

transmitting UE parameter information for generating chirp beams used by a base station to beamform a beam transmitted to the UE;

receiving a reference signal that is beamformed using a chirp beam that is based at least in part on the UE parameter information;

measuring the reference signal to generate feedback information; and transmitting the feedback information to the base station.

2. The method according to claim 1, wherein the chirp beams used by the base station are described by parameters including one or more of:

angles defining a beam center;

parameters defining a beam width;

a shape representing a desired robustness shape;

parameters defining sidelobe levels; or windowing functions.

3. The method according to claim 1, further comprising:

receiving at least one of base station capability information or base station parameter information pertaining to the chirp beams used by the base station to beamform the beam transmitted to the UE.

4. The method of claim 3, wherein the base station parameter information pertaining to the chirp beams indicates:

an identification of a beam; or parameter information used by the UE to determine the identification of the beam.

5. The method according to claim 4, further comprising:

transmitting confirmation or modification information pertaining to the base station capability information and the base station parameter information.

6. The method according to claim 1, further comprising:

receiving confirmation or modification of the UE parameter information to beamform the beam to be transmitted to the UE.

7. The method according to claim 1, further comprising:

transmitting a request to update the chirp beam used in beamforming of the beam transmitted to the UE.

8. The method according to claim 1, wherein the UE parameter information indicates a recommended beam to be beamformed by the base station.

9. The method according to claim 1, wherein the UE parameter information includes one or more of:

a velocity of the UE;

a direction of movement of the UE;

a location of the UE;

interference measured at the UE;

a signal-to-noise ratio calculated at the UE; or uncertainty of the one or more of the velocity of the UE, the direction of movement of the UE, the location of the UE, the interference measured at the UE, or the signal-to-noise ratio calculated at the UE.

10. The method according to claim 1, wherein the UE parameter information includes identification information of more than one beam.

11. The method according to claim 10, wherein the identification information of the more than one beam identifies at least a first beam for initial access and a second beam for refinement beam sweeping between the UE and the base station.

12. The method according to claim 1, wherein the UE parameter information includes an identification of a beam to be used for fall back beam recovery.

13. A device at a side of a user equipment (UE) comprising:

at least one processor; and a computer-readable medium having stored thereon, computer executable instructions, that, when executed by the at least one processor, cause the device to perform:

transmitting UE parameter information for generating chirp beams used by a base station to beamform a beam transmitted to the UE;

receiving a reference signal that is beamformed using a chirp beam that is based at least in part on the UE parameter information;

measuring the reference signal to generate feedback information; and transmitting the feedback information to the base station.

14. The device according to claim 13, wherein the chirp beams used by the base station are described by parameters including one or more of:

angles defining a beam center;

parameters defining a beam width;

a shape representing a desired robustness shape;

parameters defining sidelobe levels; or windowing functions.

15. The device according to claim 13, wherein the computer executable instructions further cause the device to perform:

receiving at least one of base station capability information or base station parameter information pertaining to the chirp beams used by the base station to beamform the beam transmitted to the UE.

16. The device according to claim 15, wherein the base station parameter information pertaining to the chirp beams comprises:

an identification of a beam; or parameter information used by the UE to determine the identification of the beam.

17. The device according to claim 16, wherein the computer executable instructions further cause the device to perform:

transmitting confirmation or modification information pertaining to the base station capability information and the base station parameter information.

18. The device according to claim 13, wherein the computer executable instructions further cause the device to perform:

receiving confirmation or modification of the UE parameter information to beamform the beam to be transmitted to the UE.

19. The device according to claim 13, wherein the computer executable instructions further cause the device to perform:

transmitting a request to update the chirp beam used in beamforming of the beam transmitted to the UE.

20. The device according to claim 13, wherein the UE parameter information indicates a recommended beam to be beamformed by the base station.

21. The device according to claim 13, wherein the UE parameter information includes one or more of:

a velocity of the UE;

a direction of movement of the UE;

a location of the UE;

interference measured at the UE;

a signal-to-noise ratio calculated at the UE; or uncertainty of the one or more of the velocity of the UE, the direction of movement of the UE, the location of the UE, the interference measured at the UE, or the signal-to-noise ratio calculated at the UE.

22. The device according to claim 13, wherein the UE parameter information pertaining to the chirp beams includes identification information of more than one beam.

23. The device according to claim 22, wherein the identification information of the more than one beam identifies at least a first beam for initial access and a second beam for refinement beam sweeping between the UE and the base station.

24. The device according to claim 13, wherein the UE parameter information includes an identification of a beam to be used for fall back beam recovery.

25. A method performed at a side of a base station comprising:

receiving user equipment (UE) parameter information for generating chirp beams used by the base station to beamform a beam transmitted to a UE related to the UE parameter information;

transmitting a reference signal that is beamformed using a chirp beam based at least in part on the UE parameter information; and receiving feedback information pertaining to the reference signal that is beamformed.

26. The method according to claim 25, wherein the chirp beams used by the base station to beamform the reference signal are described by parameters including one or more of:

angles defining a beam center;

parameters defining a beam width;

a shape representing a desired robustness shape;

parameters defining sidelobe levels; or windowing functions.

27. The method according to claim 26, further comprising:

transmitting at least one of base station capability information or base station parameter information pertaining to the chirp beams used by the base station to beamform the beam transmitted to the UE.

28. The method of claim 27, wherein the base station parameter information pertaining to the chirp beams indicates:

an identification of a beam; or parameter information used by the UE to determine the identification of the beam.

29. The method according to claim 28, further comprising:

receiving confirmation or modification information pertaining to the base station capability information and the base station parameter information pertaining to the chirp beams.

30. A device at a side of a base station comprising:

at least one processor; and a computer-readable medium having stored thereon, computer executable instructions, that, when executed by the at least one processor, cause the device to perform:

receiving user equipment (UE) parameter information for generating chirp beams used by the base station to beamform a beam transmitted to a UE related to the UE parameter information;

transmitting a reference signal that is beamformed using a chirp beam based at least in part on the UE parameter information; and receiving feedback information pertaining to the reference signal that is beamformed.

* * * * *